(12) United States Patent
Fong et al.

(10) Patent No.: US 11,184,097 B2
(45) Date of Patent: Nov. 23, 2021

(54) VLAN-AWARE CLOCK HIERARCHY

(71) Applicant: Arista Networks, Inc., Santa Clara, CA (US)

(72) Inventors: Harold Fong, Dublin (IE); Petr Budnik, Vancouver (CA); Jeff Jing Yuen Chan, Vancouver (CA)

(73) Assignee: Arista Networks, Inc., Santa Clara, CA (US)

( * ) Notice: Subject to any disclaimer, the term of this patent is extended or adjusted under 35 U.S.C. 154(b) by 121 days.

(21) Appl. No.: 16/752,280

(22) Filed: Jan. 24, 2020

(65) Prior Publication Data

US 2021/0050927 A1 Feb. 18, 2021

Related U.S. Application Data

(60) Provisional application No. 62/888,370, filed on Aug. 16, 2019.

(51) Int. Cl.
| | |
|---|---|
| *H04J 3/06* | (2006.01) |
| *H04L 12/931* | (2013.01) |
| *H04L 12/46* | (2006.01) |
| *H04L 7/00* | (2006.01) |

(52) U.S. Cl.
CPC .......... *H04J 3/0673* (2013.01); *H04L 7/0008* (2013.01); *H04L 12/4633* (2013.01); *H04L 12/4641* (2013.01); *H04L 12/4645* (2013.01); *H04L 49/354* (2013.01)

(58) Field of Classification Search
CPC ............... H04L 7/0008; H04L 12/4633; H04L 12/4641; H04L 12/4645; H04L 49/354; H04J 3/0667; H04J 3/0641; H04J 3/0673
See application file for complete search history.

(56) References Cited

U.S. PATENT DOCUMENTS

| | | | |
|---|---|---|---|
| 8,363,629 B1 | 1/2013 | Sorenson et al. | |
| 9,497,103 B2 * | 11/2016 | Williams | H04J 3/0664 |
| 2012/0099432 A1 * | 4/2012 | Bercovich | H04J 3/0658 |
| | | | 370/235 |
| 2012/0106576 A1 * | 5/2012 | Hadzic | H04J 3/0697 |
| | | | 370/503 |

(Continued)

OTHER PUBLICATIONS

PCT International Search Report and Written Opinion for PCT/US20/45979 dated Nov. 6, 2020, 13 pages.

(Continued)

*Primary Examiner* — Chi H Pham
*Assistant Examiner* — Vladislav Y Agureyev
(74) *Attorney, Agent, or Firm* — Fountainhead Law Group P.C.

(57) ABSTRACT

Synchronization of clocks among computing devices in a network includes determining master/slave relations among the computing devices. Some computing devices (e.g., switches) include trunk ports configured to carry traffic for several logical networks; e.g., virtual local area networks, VLANs. A trunk port can be associated with a master/slave setting for each logical network that it is configured for. Synchronization of clocks among the computing devices further includes running a synchronization sequence between a trunk port and each computing device on each of the logical networks configured on the trunk port.

21 Claims, 14 Drawing Sheets timing tree, 200a

(56) References Cited

U.S. PATENT DOCUMENTS

| | | | |
|---|---|---|---|
| 2013/0121351 A1* | 5/2013 | Miyabe | H04J 3/0667 370/503 |
| 2013/0170507 A1* | 7/2013 | Hsueh | H04J 3/0667 370/503 |
| 2013/0259049 A1* | 10/2013 | Mizrahi | H04J 3/0664 370/392 |
| 2014/0010239 A1* | 1/2014 | Xu | H04L 41/0836 370/395.53 |
| 2014/0281037 A1 | 9/2014 | Spada et al. | |
| 2015/0085852 A1* | 3/2015 | Mizutani | H04J 3/0667 370/350 |
| 2015/0103848 A1 | 4/2015 | Chandhoke et al. | |
| 2015/0106491 A1* | 4/2015 | Gardner | H04L 12/4641 709/223 |
| 2015/0127978 A1* | 5/2015 | Cui | H04J 3/0641 714/15 |
| 2015/0222413 A1 | 8/2015 | Pietilainen | |
| 2016/0156427 A1* | 6/2016 | Yang | H04J 3/0685 370/503 |
| 2017/0118041 A1* | 4/2017 | Bhattacharya | H04L 41/5054 |
| 2017/0272191 A1* | 9/2017 | Zhang | H04L 7/0075 |
| 2018/0227080 A1* | 8/2018 | Stein | H04J 3/0673 |
| 2018/0375603 A1 | 12/2018 | Mayer | |
| 2020/0177361 A1* | 6/2020 | Gareau | H04L 12/40013 |
| 2020/0259896 A1* | 8/2020 | Sachs | G07C 9/00174 |
| 2020/0322075 A1* | 10/2020 | Bhandari | H04L 63/126 |

OTHER PUBLICATIONS

Related U.S. Appl. No. 16/752,314, filed Jan. 24, 2020 (unpublished), 47 pages.

\* cited by examiner

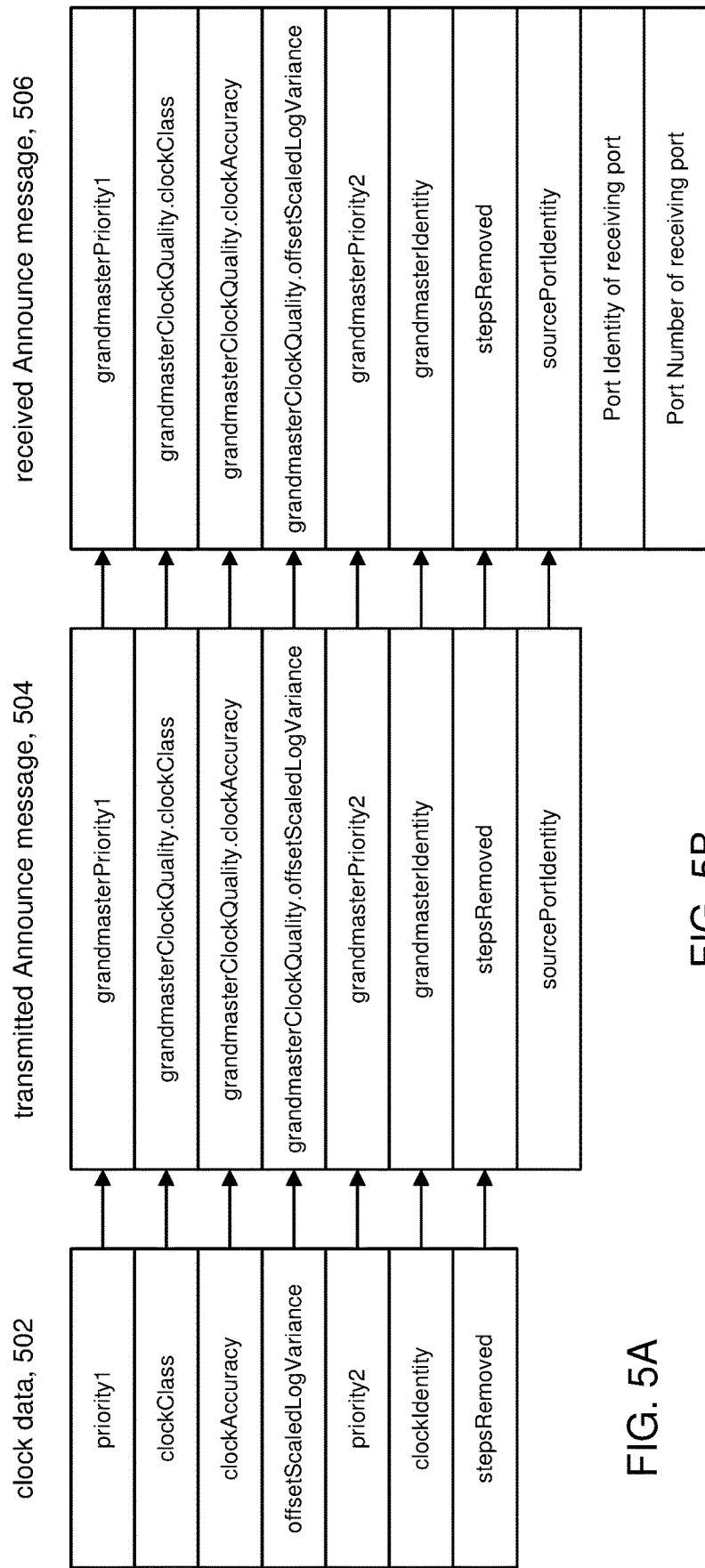

US 11,184,097 B2

VLAN-AWARE CLOCK HIERARCHY

CROSS REFERENCE TO RELATED APPLICATIONS

Pursuant to 35 U.S.C. § 119(e), this application is entitled to and claims the benefit of the filing date of U.S. Provisional App. No. 62/888,370 filed Aug. 16, 2019, the content of which is incorporated herein by reference in its entirety for all purposes.

This application is related to concurrently filed U.S. application Ser. No. 16/752,314 entitled "VLAN-Aware Clock Synchronization," the content of which is incorporated herein by reference in its entirety for all purposes.

BACKGROUND

The present disclosure relates to synchronization of clocks in computer-based devices connected in a network (e.g., computers, industrial automation equipment, and the like) to overcome latency and delay variations in the network. Synchronization becomes relevant when devices working at a distance from each other must also work in conjunction with each other. In such scenarios, a local clock synchronizes with the device clocks networked within the same system. However, even when two clocks are synchronized, there is no guarantee that they will stay in synchronization. Differences in temperature, the age of the clocks themselves, and the like can all affect the quality of synchronization.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIGS. 5A, 5B, 5C illustrate examples of data that can be used in accordance with the operations for setting port states.

DETAILED DESCRIPTION

The present disclosure relates to synchronizing of clocks in devices connected in a network (e.g., computers, industrial automation equipment, and the like) to overcome latency and delay variations in the network. In accordance with aspects of the present disclosure, the effects of network latency can be reduced by using a technique whereby pairs of nodes in the network, operating in a master/slave relation, communicate with one another to compensate for the delay between the two nodes. Merely for the purposes of illustration, the Precision Time Protocol (PTP), defined by the IEEE 1588-2008 specification and incorporated herein by reference in its entirety, will be used as an illustrative example for clock synchronization.

Some network topologies include network devices (e.g., computers, switches, etc.) configured in different VLANs (Virtual Local Area Network). Conventional PTP processing does not synchronize clocks that are in different VLANs. Clock synchronization in accordance with the present disclosure takes into consideration devices in different VLANs, as might be configured by an administrator, for instance.

Consider for example, host machines Host1-Host100 in an enterprise connected to a port on a switch. Some host machines might be in the Human Resources group, other host machines might be in the Engineering department, still other machines might be in the Sales group, and so on. Despite that the host machines are all connected to the same switch port, the host machines in the various groups and departments can still be isolated from each other by defining their own distinct VLANs. On the other hand, it is desirable that clock synchronization be made among the 100 host machines so that all 100 machines are synchronized to the same clock.

Conventional synchronization techniques allow for machines in a given VLAN to be synchronized, but do not allow machines in different VLANs to be synchronized with each other. Thus, in our example, in order to synchronize all of the 100 hosts that are connected to the same (trunk) port, the hosts would have to be on the same VLAN. By comparison, synchronization in accordance with the present disclosure takes into account that a trunk port can be configured for several VLAN.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
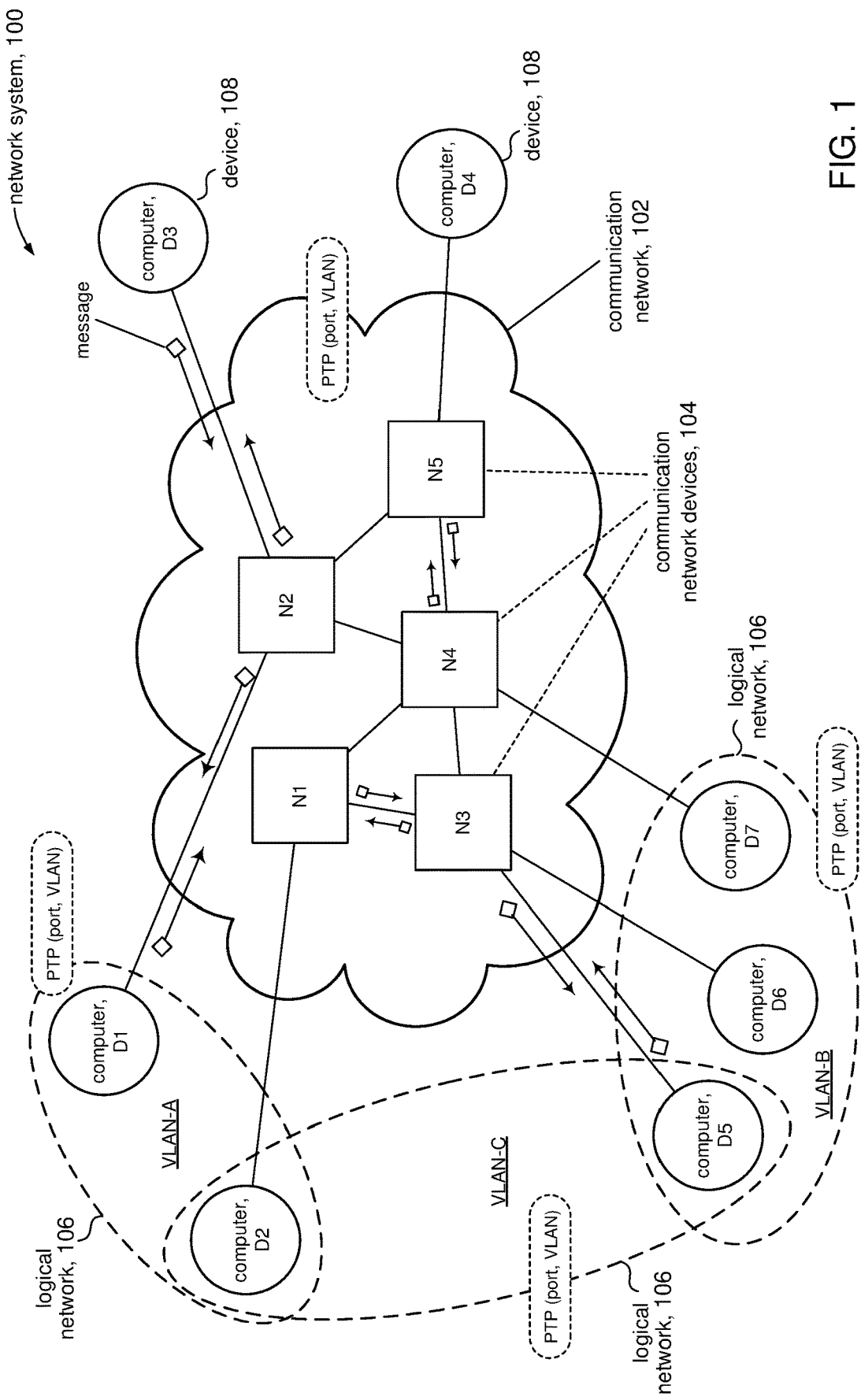
FIG. 1 illustrates a system block diagram in accordance with some embodiments.

FIG. 1 is a general representation of a networked communication system (network system) 100 configured to synchronize clocks in the constituent network devices in accordance with the present disclosure. The network system 100 includes a communication network 102 comprising a collection of interconnected cooperating switches and routers, designated as N1-N5 in the figure and collectively referred to as communication network devices 104, to provide communication among computing devices 108 (designated as D1-D7 in the figure). Computing devices 108 can include computers, computer-based machines, and computer-based systems in general. In some embodiments, the communication network 102 can be a local area network (LAN).

System 100 can be configured with one or more logical networks 106. In some embodiments, for example, the logical networks can be virtual local area networks (VLANs). Merely to illustrate, FIG. 1 shows devices D1, D2 to be configured in VLAN-A. Devices D5, D6, D7 are configured in VLAN-B. FIG. 1 shows that devices can be part of two more VLANs; e.g., devices D2, D5 are also configured in VLAN-C. Not all devices need to be part of a VLAN. For example, devices D3, D4 can be systems that do not communicate over a VLAN.

Network devices 104 and computing devices 108 can be configured to synchronize their respective clocks. In accordance with the present disclosure, clock synchronization is performed among network devices 104 and computing devices 108 taking into account the presence of any VLANs 106 in the system 100. In some embodiments, for example, clock synchronization in accordance with the present disclosure can be based on the Precision Time Protocol (PTP) standard defined by the IEEE 1588-2008 specification, which is incorporated herein by reference for all purposes. Accordingly, and merely to provide a vehicle for disclosing aspects of the present disclosure, embodiments in accordance with the present disclosure will be explained in the context of PTP processing and PTP terminology as defined in IEEE 1588-2008. Persons of ordinary skill, however, will understand that the present disclosure can be adapted to other clock synchronization methodologies.

FIG. 1 shows that VLAN-aware clock synchronization can be performed in each of the devices 104, 108. In accordance with some embodiments, clock synchronization includes two components: (1) representing the devices 104, 108 in a master clock/slave clock timing tree; and (2) synchronizing clocks in the devices 104, 108 in accordance with the master/slave relation set forth in the timing tree.

Each device 104, 108 is associated with a clock. Clock synchronization serves to synchronize the clocks in the devices 104, 108 so that the devices have a common time reference. Devices 104, 108 can be viewed as clocks and so can be referred to simply as "clocks." As depicted in FIG. 1, clock synchronization operations include sending messages between two clocks. In accordance with IEEE 1588-2008, for example, synchronization-related messages include Announce, Sync, Delay_Req, Follow_Up, and Delay_Resp. For instance, the figure depicts the exchange of synchronization-related messages between device D1 and device N2, devices D3 and N2, and devices D5 and N3, and so on. Synchronization can occur between devices comprising the communication network 102; for instance, FIG. 1 depicts the exchange of synchronization-related messages between network devices N1 and N3, N4 and N5, and so on.

Clock synchronization operations take place over a communication path between two clocks. A "communication path" is data path with no intervening ordinary or boundary clocks. A device can be referred to as an "ordinary clock" when the device has only one port (interface) that it can perform clock synchronization operations over. For example, computing devices 108 communicate over a single port and so can be referred to as ordinary clocks. A device can be referred to as an "boundary clock" when the device has multiple ports and performs clock synchronization operations over two or more of its ports. For example, network devices 104 such as multi-ported switches, can be referred to as boundary clocks.

Figure 2A:
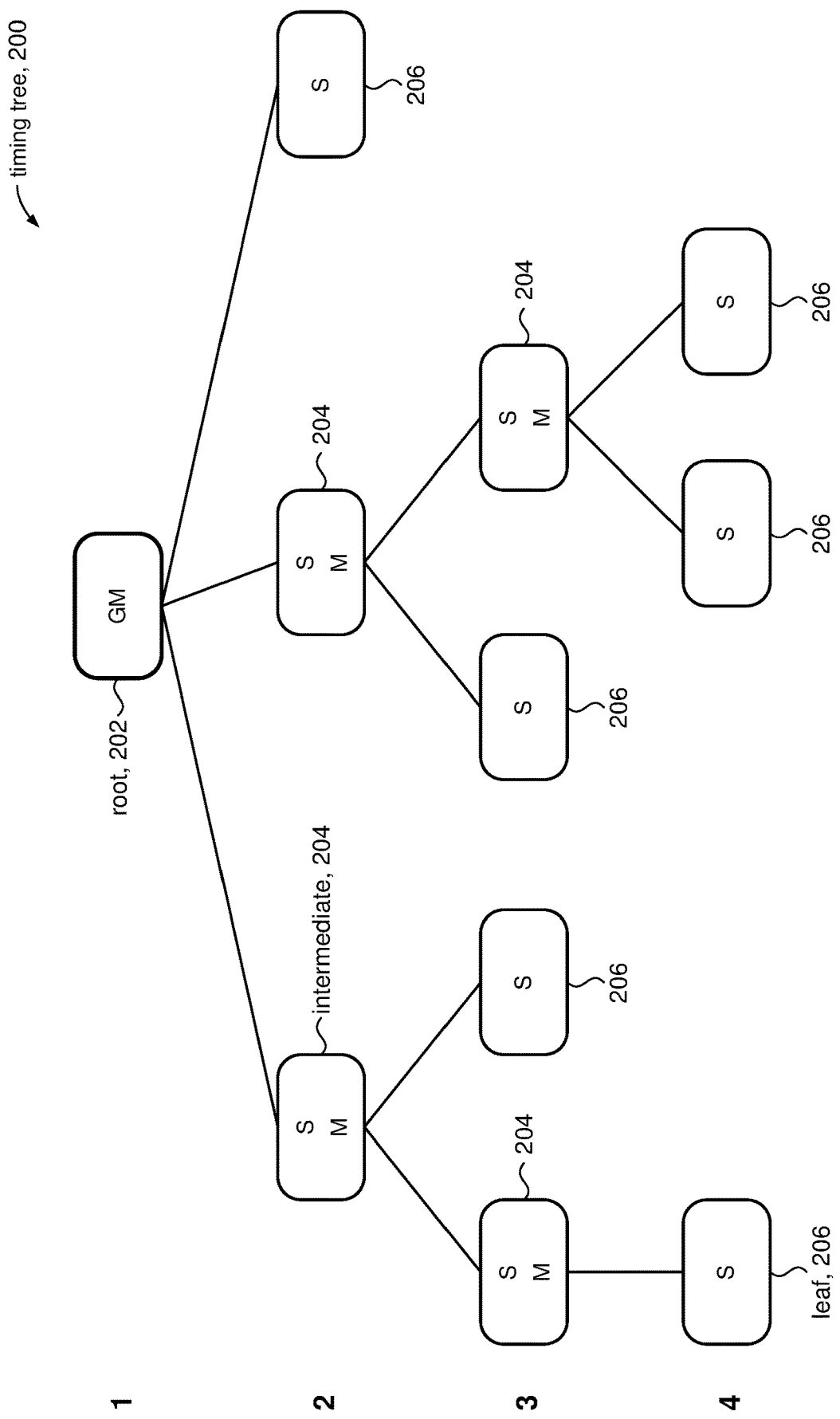
FIGS. 2A, 2B, 2C illustrate examples of a master/slave timing tree in accordance with some embodiments.

FIG. 2A illustrates an example of a master clock/slave clock timing tree 200. The timing tree 200 includes a root node 202, one or more intermediate nodes 204, and one or more leaf nodes 206, arranged in a hierarchy. The timing tree 200 shown in FIG. 2A, for example, has four levels of hierarchy. Each node represents a network device or a computing device in a network system. The root node 202 can be referred to as the grandmaster (GM) clock, and can be an ordinary clock or a boundary clock.

All clocks in the timing tree 200 either synchronize ("sync") directly with the grandmaster clock (i.e., clocks at level 2 in the hierarchy) or are indirectly synchronized to the grandmaster clock as in the case of clocks lower than level 2 in the hierarchy. For example, clocks at level 2, acting as slave clocks, will sync with the grandmaster clock. Clocks at level 3 acting as slave clocks will synchronize with clocks at level 2 now acting as master clocks. and so on down the hierarchy.

The MASTER/SLAVE designation of a clock refers to the state of the port(s) on that clock. For example, the port in an ordinary clock can be in a MASTER state or a SLAVE state. A port on a boundary clock can be in a MASTER state, a SLAVE state, or a PASSIVE state. In the case of a boundary clock, one of the ports will be in the SLAVE state, while the other ports can be in the MASTER or PASSIVE state.

Figures 2B, 2C:
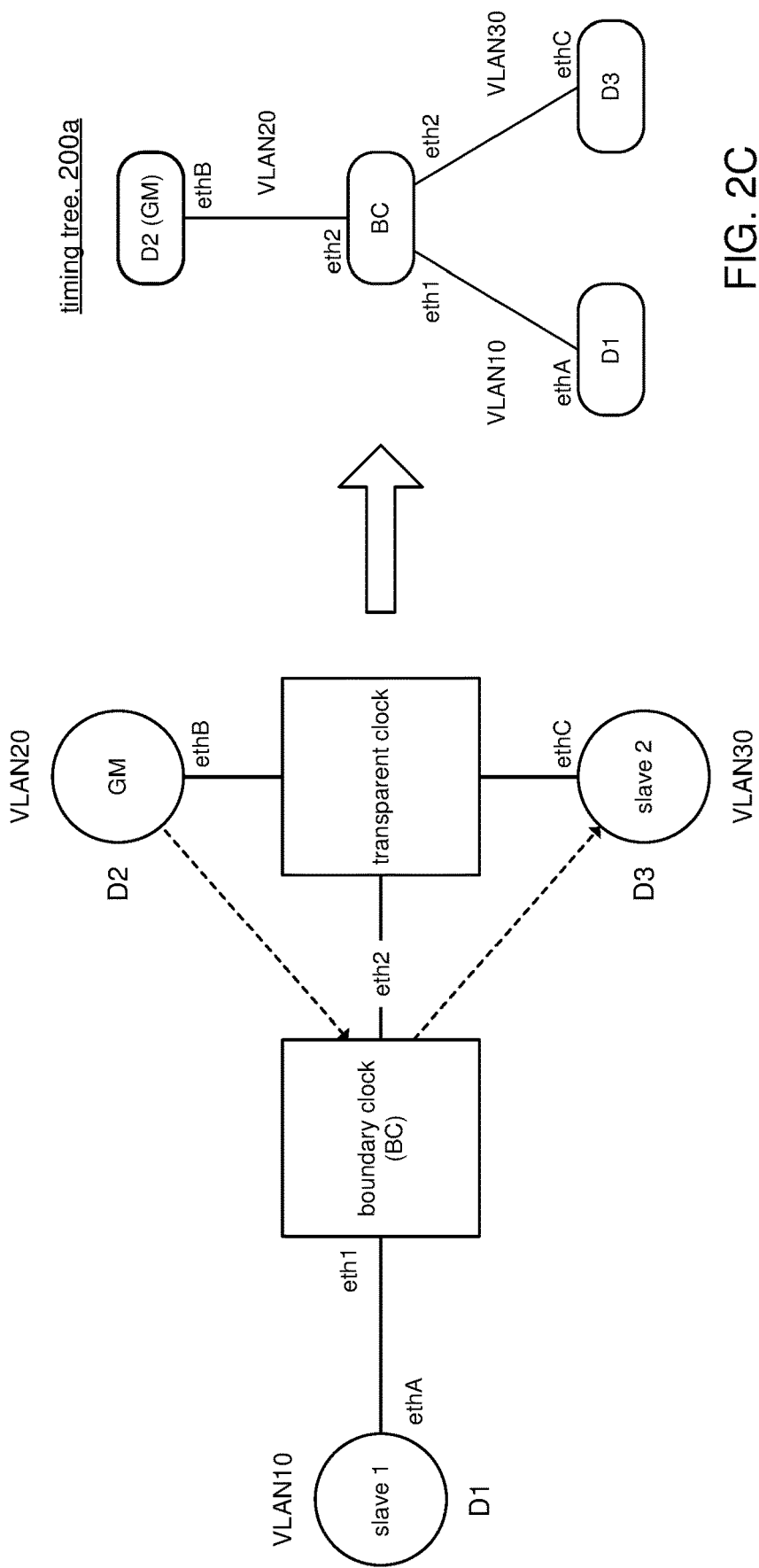

A timing tree in accordance with the present disclosure can represent devices across different logical networks (e.g., VLANs) on the same (trunk) port. In accordance with the present disclosure, such a trunk port can be in the SLAVE state relative to a clock higher up in the hierarchy, and in the MASTER state relative to a clock lower in the hierarchy. FIG. 2B, for example, illustrates this with a simplified configuration, showing a boundary clock with two Ethernet ports eth1, eth2. Ethernet port eth1 is a MASTER port to a SLAVE port (not shown) in device D1 on VLAN10. Likewise, Ethernet port eth2 is a MASTER port to device D3 on VLAN30. At the same time, Ethernet port eth2 is also a SLAVE port to device D2 on VLAN20. Timing tree 200a in FIG. 2C represents the configuration shown in FIG. 2B.

Figure 3:
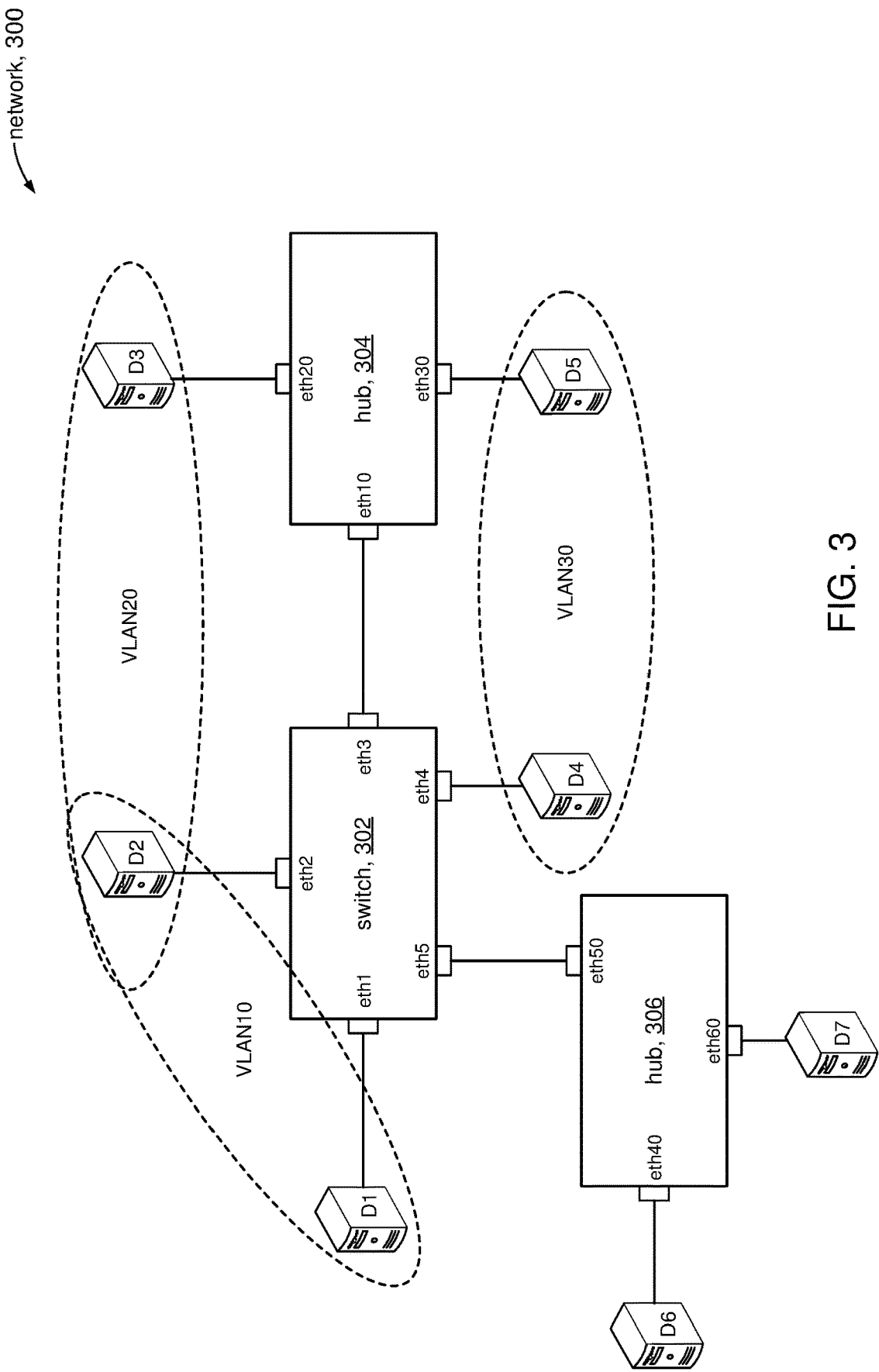
FIG. 3 depicts a specific configuration for illustration purposes.

The description will now turn to a discussion of generating a master clock/slave clock timing tree in accordance with some embodiments of the present disclosure. FIG. 3 shows a simplified network 300 that can serve as an example to facilitate the discussion. The figure shows a switch 302 having ports (interfaces) eth1, eth2, eth3, eth4, eth5, a hub 304 having ports eth10, eth20, eth30, and a hub 36 having ports eth40, eth50, eth60. Computer devices D1, D2, D4 are connected to switch 302 on respective ports eht1, eth2, eth4. Hub 304 is connected to port eth3 on switch 302. Computer devices D3, D5 are connected to respective ports eth20, eth30 on hub 304. Hub 306 is connected to port eth5 on switch 302. Computer devices D6, D7 are connected to respective ports eth40, eth60 on hub 306.

The network 300 is configured with three logical networks, VLAN10, VLAN20, VLAN30. Devices D1, D2 are on VLAN10 and devices D4, D5 are on VLAN30. Device D2 is also on VLAN20 with device D3. Consider the various ports on switch 302. Port eth2 on switch 302 can carry traffic for VLAN10 and VLAN20. Likewise port eth3 on switch 302 can carry traffic for VLAN20 and VLAN30. Ports eth2 and eth3 are referred to as "trunk" ports because they are associated with or otherwise configured for two or more logical networks such as VLANs. Ports eth1 and eth4 are also referred to as trunk ports because they are on a VLAN. However, ports eth1 and eth4 are sometimes referred to as "access" ports because each is configured for a single VLAN; port eth1 is on VLAN10 and port eth4 is on VLAN30. Port eth5 on switch 302 can be referred to as a "non-trunk" port because the port is not associated with or otherwise configured for any logical network. The ports on switches 304, 306 are similarly designated as trunk, access, or non-trunk ports.

Generally, a timing tree is established by setting the port states (state variables) of the ports of each of the devices in a network; the network topology defines the connectivity of the nodes in the timing tree. The timing tree is port-based; one port on a device can be in the MASTER state while another port on the same device can be in the SLAVE state. Each device in a network that is either an ordinary clock or a boundary clock determines a state for each of its ports. Switch 302 in FIG. 3, for example, is a boundary clock while devices D1-D7 are ordinary clocks. Some devices are referred to as transparent clocks; hubs 304, 306 for instance can be considered transparent clocks. Port states are not determined for transparent clocks.

Figure 4:
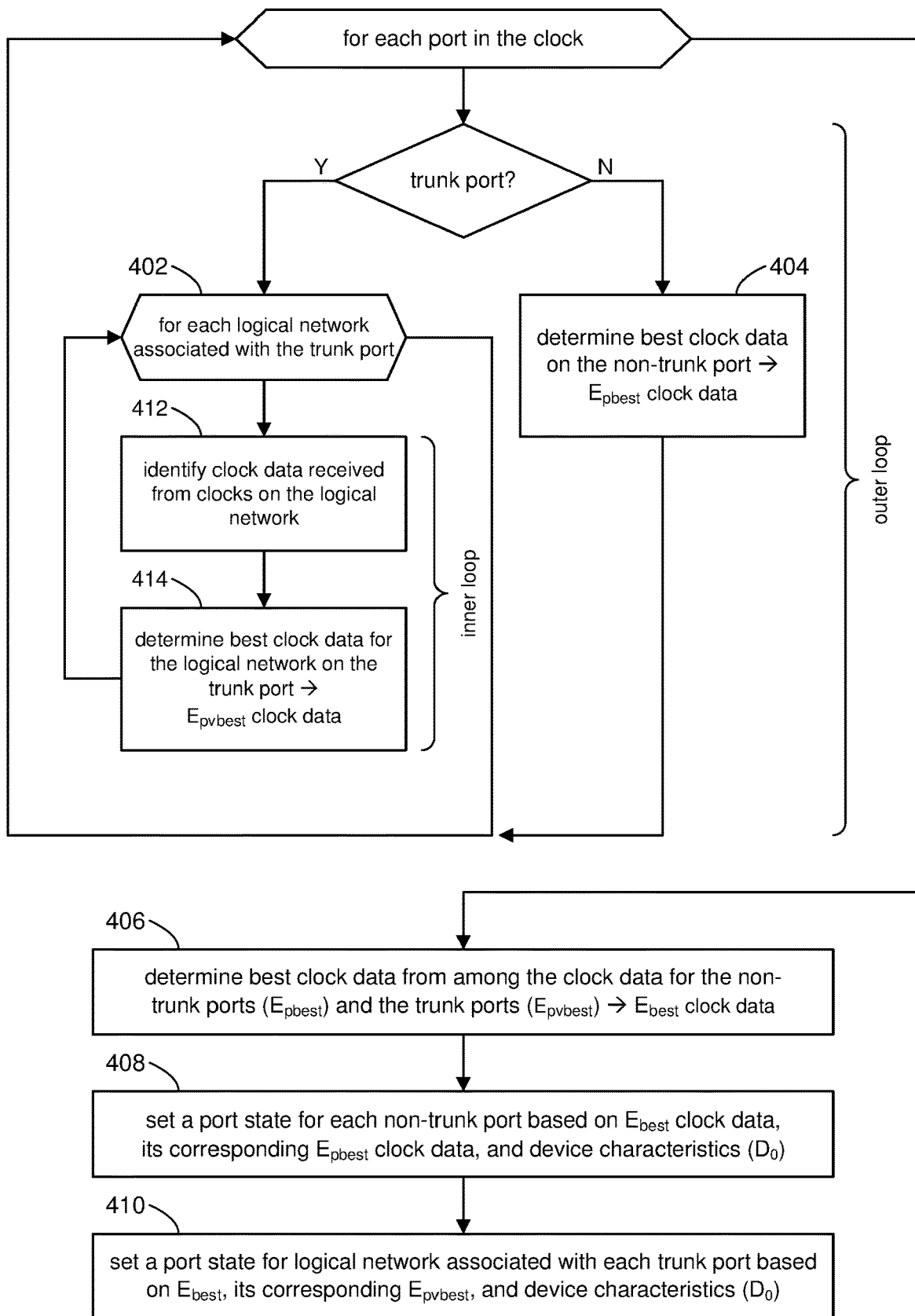
FIG. 4 shows operations for setting port states for ports in a computing device in accordance with the present disclosure.

Referring to FIG. 4, the discussion will now turn to a high level description of processing in a clock (network device) to determine the port state of each of its ports in accordance with the present disclosure. It is noted that processing in accordance with the operations depicted in FIG. 4 is performed by every boundary clock and ordinary clock in the network. The clock will be referred to as "the local clock" for purposes of describing FIG. 4.

Reference will be made to switch 302 (a boundary clock) in FIG. 3 to illustrate the operations. In some embodiments, the local clock can include computer executable program code, which when executed by a processor (e.g., 1202, FIG. 12) in the local clock, can cause the processor to perform processing in accordance with FIG. 4. The flow of operations performed by the processor is not necessarily limited to the order of operations shown. Moreover, operations may be combined or broken out into smaller operations in various embodiments.

Processing is generally performed for each port (trunk and non-trunk) in the local clock (outer loop), independently of activity in the other ports. In some embodiments, a non-trunk port can receive clock data from ports of clocks connected to the communication path serviced by that port. Recall that a communication path between a port P1 on one clock and a port P2 on another clock is a path with no intervening ordinary or boundary clocks between P1 and P2. Referring to FIG. 3, for example, the path between devices D6 and D7 constitutes a communication path. On the other hand, the path between the port (not shown) on device D1 and device D5 is not a communication path because of intervening switch 302 (a boundary clock).

In accordance with the present disclosure, a trunk port can receive clock data received from the ports of clocks on each logical network associated with the trunk port. For example, a trunk port associated with VLAN-A and VLAN-B will receive clock data from clocks on VLAN-A and clock data from clocks on VLAN-B. As explained below, clock data received on one VLAN (e.g., VLAN-A) is processed separately from clock data received on another VLAN (e.g., VLAN-B).

In some embodiments in accordance with IEEE 1588-2008, the clock data can be a "data set" that is sent from one clock to another clock in an Announce message. Clock data includes, among other information, data that indicates the accuracy of a clock. In the case of clock data received on a trunk port, processing proceeds according to inner loop 402. In the case of clock data received on a non-trunk port, processing proceeds according to operation 404.

Trunk Port Processing

At inner loop 402, in the case of a trunk port, the local clock can process each logical network that is associated with the trunk port. As explained above, each port receives clock data (e.g., via Announce messages) from clocks on the communication path serviced by that port. For a trunk port, the port will receive clock data from clocks on its logical networks. In accordance with the present disclosure, the local clock can process received clock data on a per logical network basis.

Accordingly, at operation 412, the local clock can identify clock data received from clocks that are on a given logical network associated with the trunk port. For example, the received Announce message can be encapsulated in an Ethernet frame that is tagged in accordance with the IEEE 802.1Q standard for VLANs. The logical network (i.e., VLAN) can be identified by the VLAN identifier (VID) that is contained in the received Ethernet frame (e.g., FIG. 11A). Referring to FIG. 3, for example, port eth2 (a trunk port) on switch 302 can receive clock data from devices D1 and D2 on VLAN10, and clock data from devices D2 and D3 on VLAN20. Likewise, trunk port eth3 can receive clock data from device D3 on VLAN20 and clock data from device D5 on VLAN30, and so on.

At operation 414, the local clock can compute or otherwise determine the best clock data ($E_{pvbest}$) from among all the clock data received on a given logical network. Here, "best" clock data corresponds to the clock that is deemed to provide the most accurate time among the clocks on the given logical network. $E_{pvbest}$ clock data can be determined for each logical network associated with the trunk port. Referring to FIG. 3, for example, $E_{pvtest}$ clock data can be determined for VLAN10 using clock data received from device D1 and clock data received from device D2. Likewise, $E_{pvbest}$ clock data can be determined for VLAN20 using clock data received from device D2 and clock data received from device D3, and so on.

In some embodiments, a comparison algorithm (FIGS. 6A, 6B) can be used to compare a pair of clock data to determine which of the two clock data represents the more accurate clock. Consider the following set of clock data for example: C1, C2, C3, C4, C5. The comparison algorithm can be repeatedly invoked to compare pairs of clock data to determine the best clock data among the set C1, C2, C3, C4, C5. For example, clock data C1 and C2 can be compared to determine the better of the two clock data. The resulting clock data from the comparison can be compared to clock data C3 to determine the better clock data, and so on to determine the clock data of the clock that is deemed to provide the most accurate time among the other clock data, namely, the "best" clock data.

Referring to FIG. 3, for example, the inner loop can compute $E_{pvbest}$ clock data for the following (trunk port, VLAN) pairs:

| $E_{pvbest}$ clock data | sources of clock data |
| --- | --- |
| (eth1, VLAN10) | D1 |
| (eth2, VLAN10) | D1, D2 |
| (eth2, VLAN20) | D2, D3 |
| (eth3, VLAN20) | D3 |
| (eth3, VLAN30) | D5 |
| (eth4, VLAN30) | D4, D5 |

For example, port eth2 on a first logical network VLAN10, the most accurate clock may deemed to be device D2 (in other words, the clock data for D2 is the "best" among the clock data for D1 and the clock data for D2). For the same port eth2, but on a second logical network VLAN20, the most accurate clock may deemed to be device D3 (stated differently, the clock data for D3 is the "best" as between the clock data for D2 and the clock data for D3), and so on.

The above example, shows that in some configurations a trunk port/VLAN pair may only have one device. In those cases, the $E_{pvbest}$ clock data is the clock data received from that one device; e.g., (eth1, VLAN10), (eth3, VLAN20), (eth3, VLAN30). For example, device D1 is deemed to be the most accurate clock for port eth1 on logical network VLAN10. Recall from above, that trunk ports eth1 and eth4 can also be referred to as "access" ports because each port is on a single VLAN. In some embodiments, access ports can be treated as non-trunk ports and, as such, references to non-trunk ports can be understood as applying to access ports as well.

Non-Trunk Port Processing

At operation 404, in the case of a non-trunk port, the local clock can determine the best clock data from among the clock data received on the non-trunk port. Here, "best" clock data corresponds to the clock that is deemed to provide the most accurate time among the clocks connected to the communication path serviced by that non-trunk port. In some embodiments, for example, the local clock can determine the best clock data ($E_{pbest}$) from among the clock data received from every clock connected to that non-trunk port. The clock data comparison algorithm discussed below can be used to determine the $E_{pbest}$ clock data from clock data received on the non-trunk port. Referring for example to FIG. 3, eth5 is a non-trunk port and devices D6, D7 are connected to the port by virtue of hub 306. Accordingly, the $E_{pbest}$ clock data for port eth5 is determined based on comparing (e.g., FIGS. 6A, 6B) clock data received from device D6 and from device D7. As noted above, ports eth1 and eth4, being access ports, can be treated as non-trunk ports in some embodiments. Accordingly, in some embodiments, respective $E_{pbest}$ clock data, rather than $E_{pvbest}$ clock data, can be computed for ports eth1 and eth4.

At operation 406, the local clock can determine the best clock data ($E_{best}$) based on the $E_{pbest}$ clock data determined for each non-trunk/access port and $E_{pvbest}$ clock data determined for each logical network on each trunk port. The $E_{best}$ clock data represents the best clock data from all the computed $E_{pbest}$ and $E_{pvbest}$ clock data, and can be determined using the clock data comparison algorithm discussed below. Here, "best" clock data corresponds to the clock that is deemed to provide the most accurate time among all the clocks connected to the non-trunk ports of the local clock and to each logical network on each trunk port of the local clock.

At operation 408, the local clock can set the port state for each non-trunk/access port based on the $E_{best}$ clock data, the $E_{pbest}$ clock data that corresponds to the non-trunk/access port, and device clock data ($D_0$) of the local clock itself. This operation is performed for each non-trunk port for which $E_{pbest}$ clock data has been computed. For each non-trunk port, a single port state is determined. Details for determining port state are discussed below.

At operation 410, the local clock can set the port state for each trunk port and logical network pair, based on the $E_{best}$ clock data, the $E_{pvbest}$ clock data that corresponds to the local network on that trunk port, and device clock data ($D_0$) of the local clock itself. For a trunk port, several port states can be determined; there is one port state determined for each logical network on that trunk port for which $E_{pvbest}$ clock data has been computed. In the example of FIG. 3, for instance, while a single port state is determined for eth5 (non-trunk port), two port states are determined for eth2: one port state for the eth2/VLAN10 pair and another port state for the eth2/VLAN20 pair. Details for determining port state are discussed below.

As explained above, the operations of FIG. 4 can be performed for each clock in the network to establish the MASTER/SLAVE state of ports on the clocks. This results in a master clock/slave clock timing tree, such as illustrated in FIG. 2A for instance. The physical connections between devices in the network determines the connectivity between nodes in the timing tree, while the MASTER/SLAVE states determine the master/slave hierarchy.

The discussion will now turn to a brief description of the clock data that is used in determining the best clock, in accordance with some embodiments. In some embodiments in accordance with IEEE1588-2008, for example, one clock is compared with another clock to determine which is the better clock (in terms of providing accurate time) by comparing the respective clock data ("data sets") that represent those clocks; see operations 414 and 404 in FIG. 4, for example. In some embodiments, a clock can transmit its data set in an IEEE 1588-2008 Announce message.

FIG. 5A shows an example of clock data 502 that can be associated with each clock in some embodiments in accordance with IEEE 1588-2008. The clock data 502 for a clock can include the following data fields:

priority1—a user configurable designation that the clock belongs to an ordered set of clocks from which a master is selected clockClass—an attribute that denotes the traceability of the time or frequency distributed by the grandmaster clock clockAccuracy—an attribute that indicates the expected accuracy of a clock in the event it becomes the grandmaster offsetScaledLogVariance—an attribute defining the stability of a clock priority2—a user configurable designation that provides finer grained ordering among otherwise equivalent clocks clockIdentity—a tie-breaker based on unique identifiers stepsRemoved—the number of communication paths traversed between the clock and the grandmaster clock; in FIG. 2A, for example, clock 206a is three steps removed from the grandmaster clock 202

FIG. 5B shows an example of a transmitted Announce message 504 that each clock transmits to other clocks as part of the process of defining the timing tree. The clock data 502 is contained in corresponding data fields in the transmitted Announce message 504. An additional data field can be included in the transmitted Announce message 504:

sourcePortIdentity—an identifier of the port on the clock that transmitted the Announce message FIG. 5C shows an example of a received Announce message 506 that is processed by the receiving clock. Additional data fields are included in the received Announce message 506, including:

Port Identity of the receiving port—identifier of the port on the clock that receives the Announce message Port Number of the receiving port—port number of the port on the clock that receives the Announce message Determining the best clock uses a comparison algorithm to compare the clock data of two clocks to determine which clock data describes the better clock, in terms of providing accurate time. This is used to determine which of the clocks described in several Announce messages received by a local clock port is the best clock. The comparison algorithm includes comparing the clock data in received Announce messages to compute or otherwise obtain $E_{pvbest}$ clock data, $E_{pbest}$ clock data, and $E_{best}$ clock data.

Figure 6A:
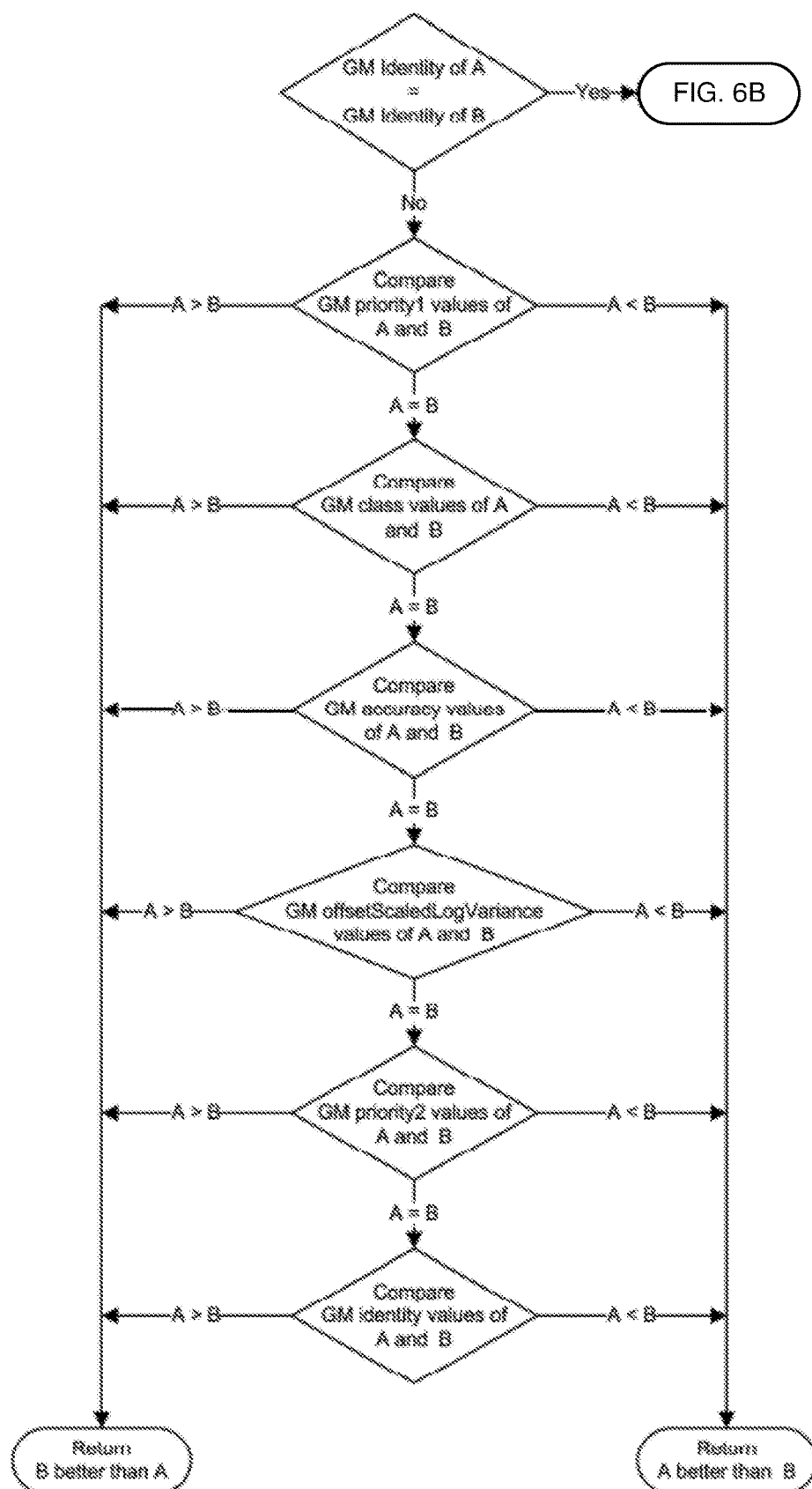
FIGS. 6A, 6B show operations for comparing clock data.
Figure 6B:
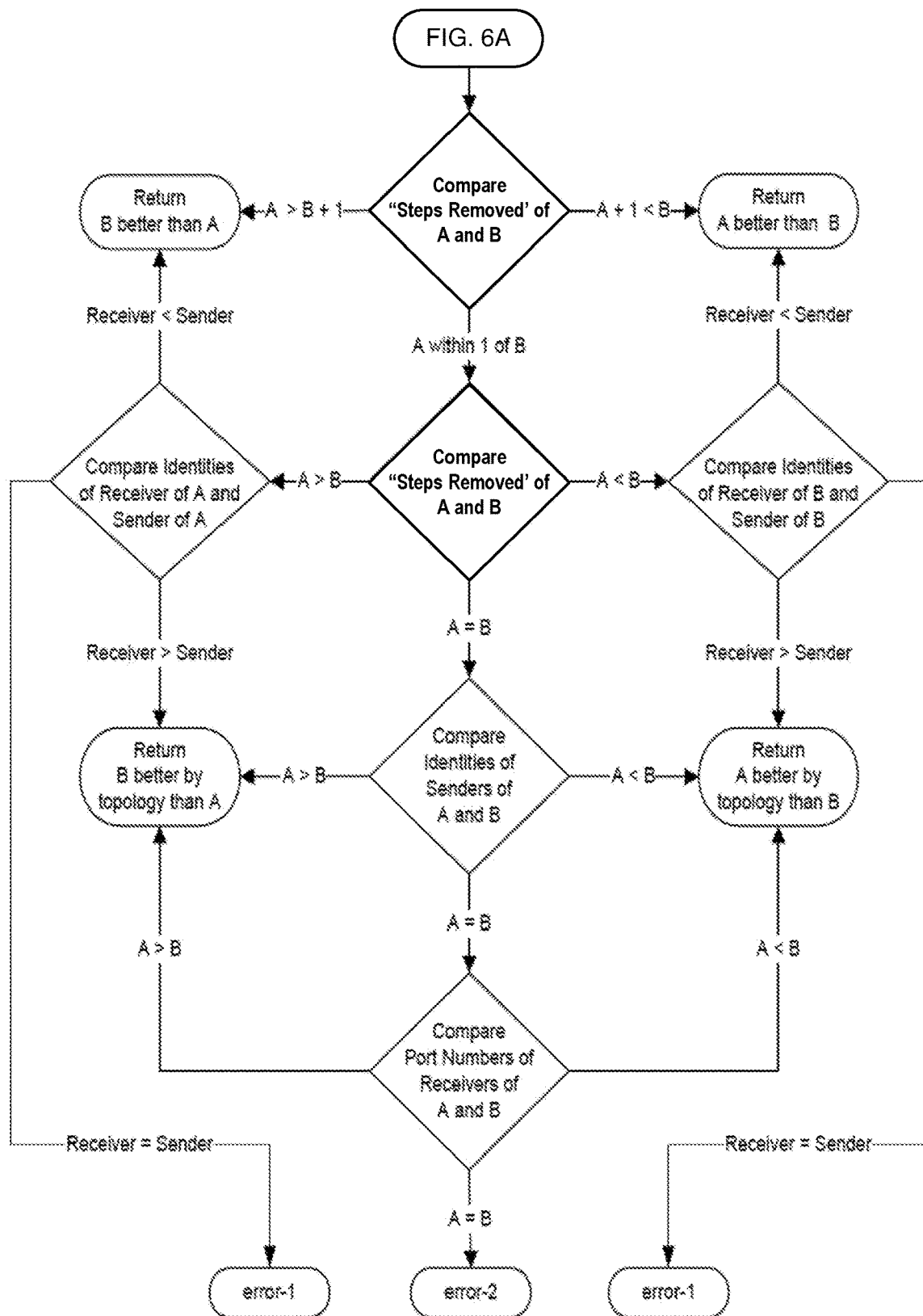
Figure 7:
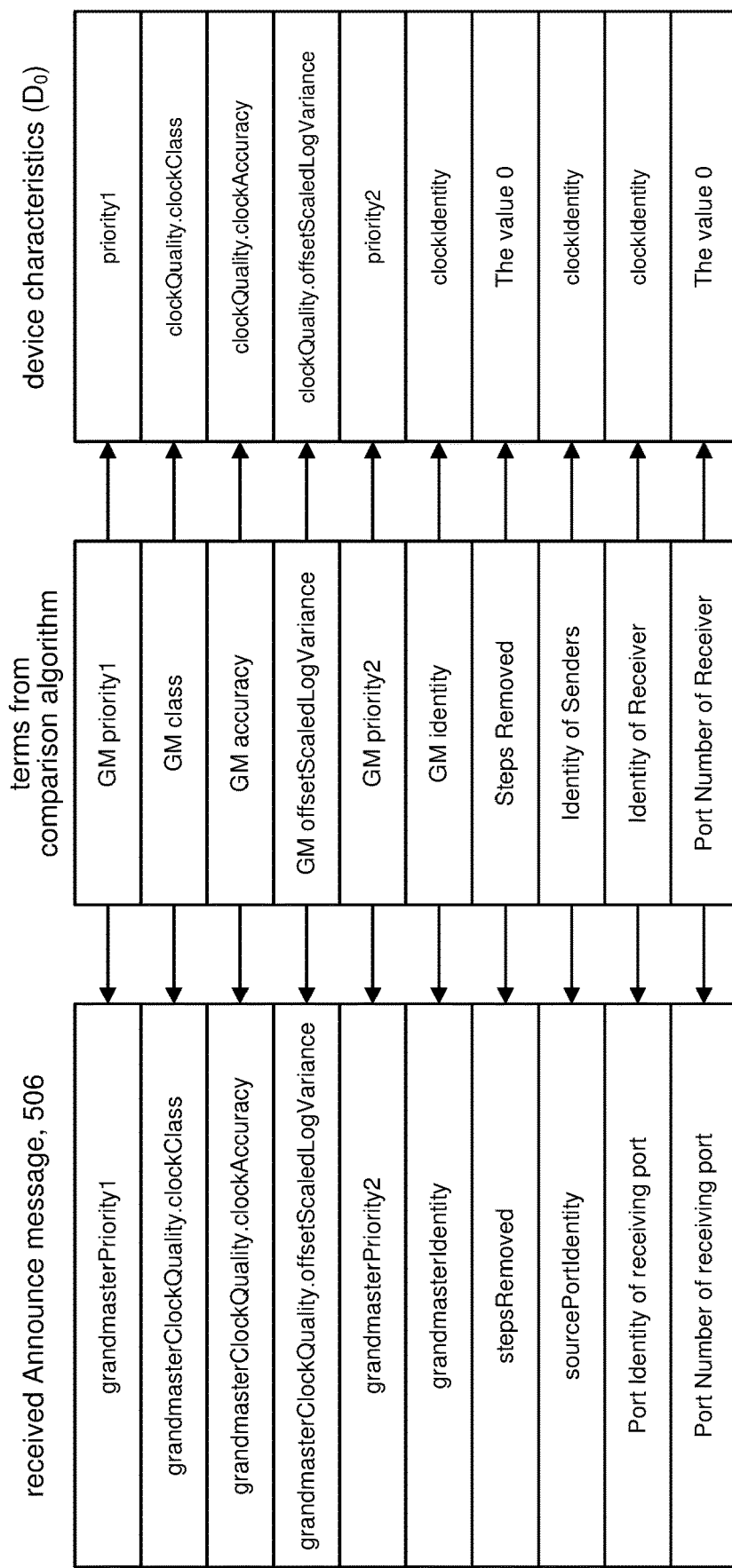
FIG. 7 illustrate an example of data that can be used in accordance with the operations for setting port states.

FIGS. 6A and 6B show an example of a comparison algorithm based on IEEE 1588-2008 in accordance with some embodiments that can be used to make the best clock determinations described in FIG. 4. The comparison algorithm is invoked in FIG. 4 to compare two sets of clock data, clock data A and clock data B. FIG. 7, shows how the terms used in the algorithm shown in FIGS. 6A and 6B map to corresponding data fields in the received Announce message 506. The comparison algorithm comprises a series of decision points that compare data fields from clock A to corresponding data fields in clock B. The algorithm includes several return points at various decision points where a determination is made that one clock is better than the other. The algorithm returns with an indication of the better of the A and B clocks.

Figure 8:
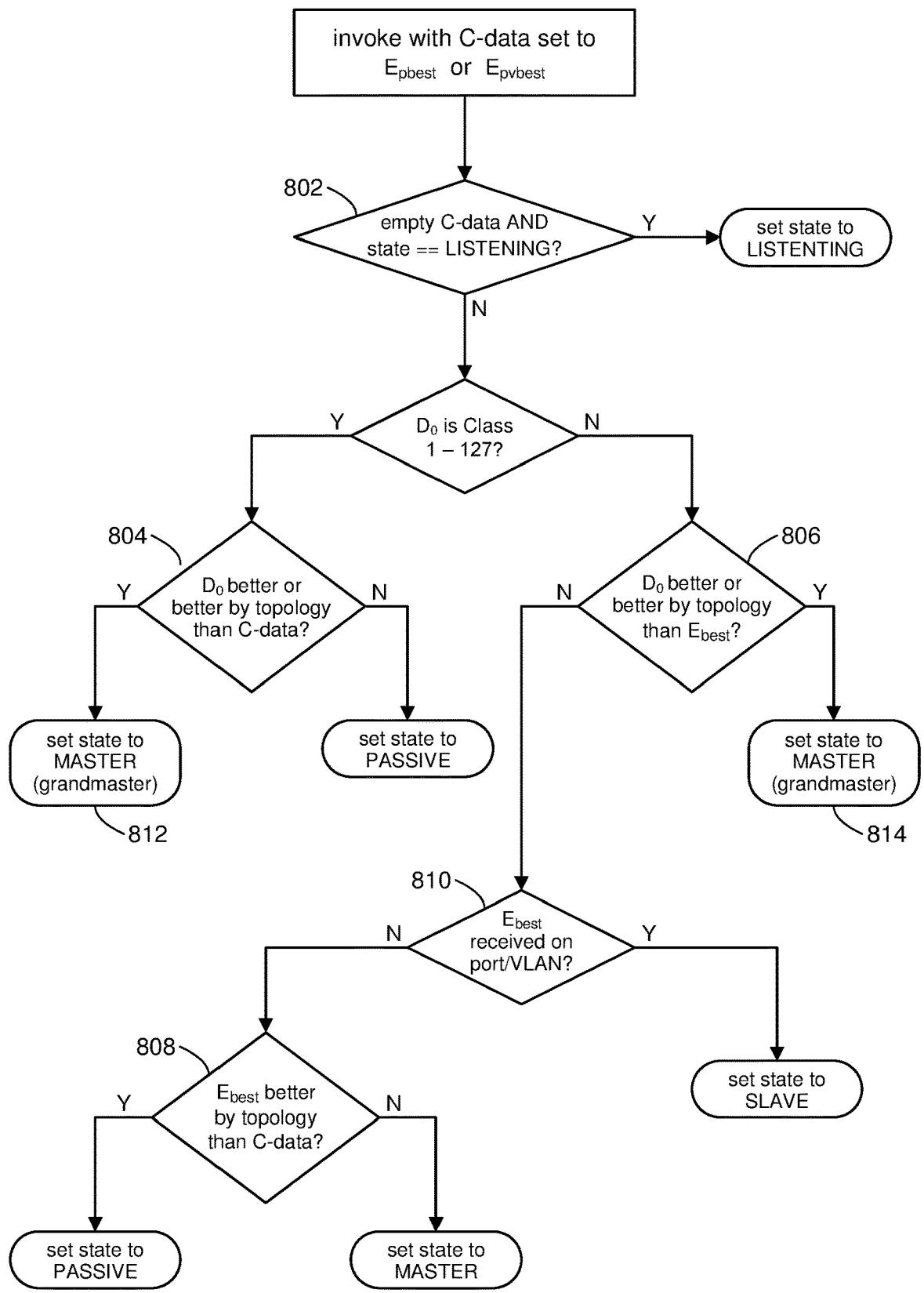
FIG. 8 shows operations for setting port states for a port in accordance with the present disclosure.

Referring to FIG. 8, the discussion will now turn to a description of setting port states in a clock in accordance with the present disclosure. Recall from operation 408 that the port state for a non-trunk port is set based on the $E_{best}$ clock data, the port's corresponding $E_{pbest}$ clock data, and the device clock data ($D_0$). At operation 410, for a trunk port, a port state is set for each logical network (e.g., VLAN) associated with the trunk port, and is based on the $E_{best}$ clock data, the $E_{pbest}$ clock data that corresponds to the trunk port/VLAN pair, and the device clock data ($D_0$).

FIG. 8 shows a state decision algorithm for determining a port state in accordance with the present disclosure. The state decision algorithm sets a port to one of four port states: MASTER, SLAVE, PASSIVE, LISTENING. The PASSIVE state is used to disable a port for the purposes of clock synchronization in order to eliminate loops in the timing tree. The LISTENING state is an initial state that the ports in a device are in when the device powers on. FIG. 8 shows two conditions (at 812, 814) whereby a port or a port/VLAN can be set to be the grandmaster clock.

The state decision algorithm represents the logic that runs a state machine on each port. In the case of a non-trunk port, the algorithm is invoked to run a state machine on that non-trunk port. In the case of a trunk port, the algorithm is invoked for each logical network that is associated with the trunk port to run a state machine for each logical network. Although the state machines use the $E_{best}$ clock data, which is the determined from the $E_{pvbest}$ and $E_{pbest}$ clock data, the state machines otherwise run independently of each other, so that the state of a non-trunk port and the state of each trunk port/VLAN pair are set independently of each other.

Decision points 802, 804, 806, 808 in the state decision algorithm makes reference to a term called "C-data." This term refers to the clock data that the state decision algorithm is invoked with. For a non-trunk port, for example, the algorithm is invoked with the $E_{pbest}$ clock data that corresponds to the non-trunk port; accordingly, C-data for a non-trunk port refers to the corresponding $E_{pbest}$ clock data. The state decision algorithm will use $E_{pbest}$ clock data at decision points 802, 804, 806, 808. In the case of a trunk port, the algorithm is invoked for a given logical network on that trunk with the $E_{pvbest}$ clock data that corresponds to the given logical network; C-data refers to $E_{pvbest}$ clock data. The state decision algorithm will use $E_{pvbest}$ clock data at decision points 802, 804, 806, 808.

Decision point 810 makes reference to "port/VLAN." In the case of a non-trunk port, "port/VLAN" just refers to the non-trunk port itself, "VLAN" is not relevant since a non-trunk port is not configured for VLANs. Likewise for access ports, since an access port is on a single VLAN. Accordingly, decision point 810 for a non-trunk port and for an access port determines whether the $E_{best}$ clock data came from a clock on a communication path serviced by that non-trunk port or access port. In the case of a trunk port, "port/VLAN" refers to both the trunk port and a given logical network (e.g., VLAN) associated with that trunk port; the decision is made based on the logical network, namely whether the $E_{best}$ clock data came from a clock on that logical network.

Decision points 804 and 806 invoke the comparison algorithm (FIGS. 6A, 6B) to compare the device clock data ($D_0$) with the $E_{pbest}$ clock data or $E_{pvbest}$ clock data. FIG. 7 shows data fields in the device clock data ($D_0$) that correspond to the terms used in the comparison algorithm.

The discussion will now turn to a description of synchronizing clocks in accordance with the present disclosure. Generally, the idea of synchronizing the clocks on devices connected by a network involves sending messages over the network among the devices. For the purposes of the following discussion, the IEEE 1588-2008 PTP protocol will be used to explain some embodiments in accordance with the present disclosure.

Referring again to FIG. 1, in accordance with some embodiments, synchronizing clocks (e.g., devices 104, 108) in a system 100 includes exchanging synchronization messages. "Announce" messages were discussed above in connection with establishing the master/slave relation among clocks in the system, which can be represented in a master/slave timing tree such as shown in FIG. 2A, for example. More specifically, the master/slave relation is established with respect to ports (interfaces) on the clocks, and in accordance with the present disclosure with respect to logical networks for those ports that are trunk ports.

Figure 9:
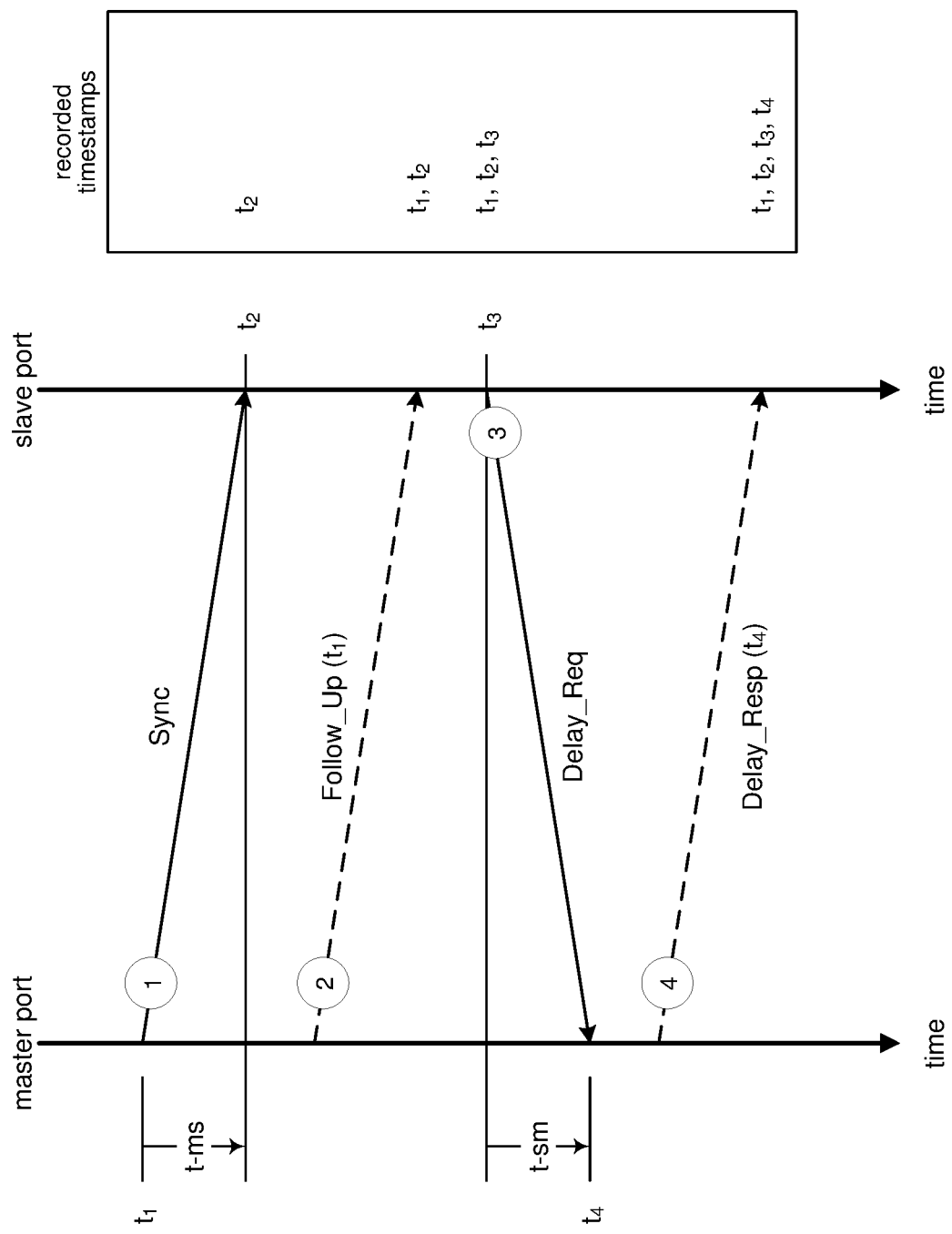
FIG. 9 illustrates a synchronization sequence.

Referring now to FIG. 9, a synchronization sequence in accordance with some embodiments is shown. For discussion purposes, the synchronization sequence in accordance with IEEE 1588-2008 will be used as an example. The synchronization sequence between a master clock and a slave clock can be initiated on a port of the master clock (referred to herein as "master port"), followed by an exchange of messages between the master port and a port on the slave clock (referred to herein as "slave port"). In accordance with the present disclosure, the synchronization sequence on a trunk port can be performed multiple times, once for each logical network associated with the trunk port. Further in accordance with the present disclosure, the trunk port can be a master port on one logical network and a slave port on another logical network.

The sequence will be described with respect to the sequence numbers shown in the figure by the circled numbers. At sequence 1, the master port sends a Sync message to the slave port. The master port notes the time $t_1$ at which the Sync message was sent, while the slave port records the time of reception $t_2$ of the Sync message. At sequence 2, the master port conveys to the slave port the timestamp $t_1$ by embedding the timestamp in a Follow_Up message that is sent to the slave port (2-step boundary clock). The slave port receives the Follow_Up message and records the timestamp. In other embodiments that employ a 1-step boundary clock, the $t_1$ timestamp can be embedded in the Sync message. At sequence 3, the slave port sends a Delay_Req message to the master port and records the time $t_3$ at which it was sent. The master port receives the Delay_Req message and notes the time of reception $t_4$. At sequence 4, the master port conveys to the slave port the timestamp $t_4$ by embedding it in a Delay_Resp message that is sent to the slave port. The slave port receives the Delay_Resp message and records the timestamp.

At the conclusion of this exchange of messages, the slave clock has recorded all four timestamps. These timestamps can be used to compute the offset between the slave clock and the master clock, the details of which are beyond the scope of the present disclosure.

The discussion will now turn to a description of operations in both the master clock and the slave clock to process the exchange of messages for conducting synchronization in accordance with the present disclosure. For discussion purposes, the exchange of messages between master clock and slave clock will be described in terms of Ethernet frames. It will be understood, however that other embodiments may employ different data transfer protocols, or may include additional encapsulation, and so on.

Figure 10A:
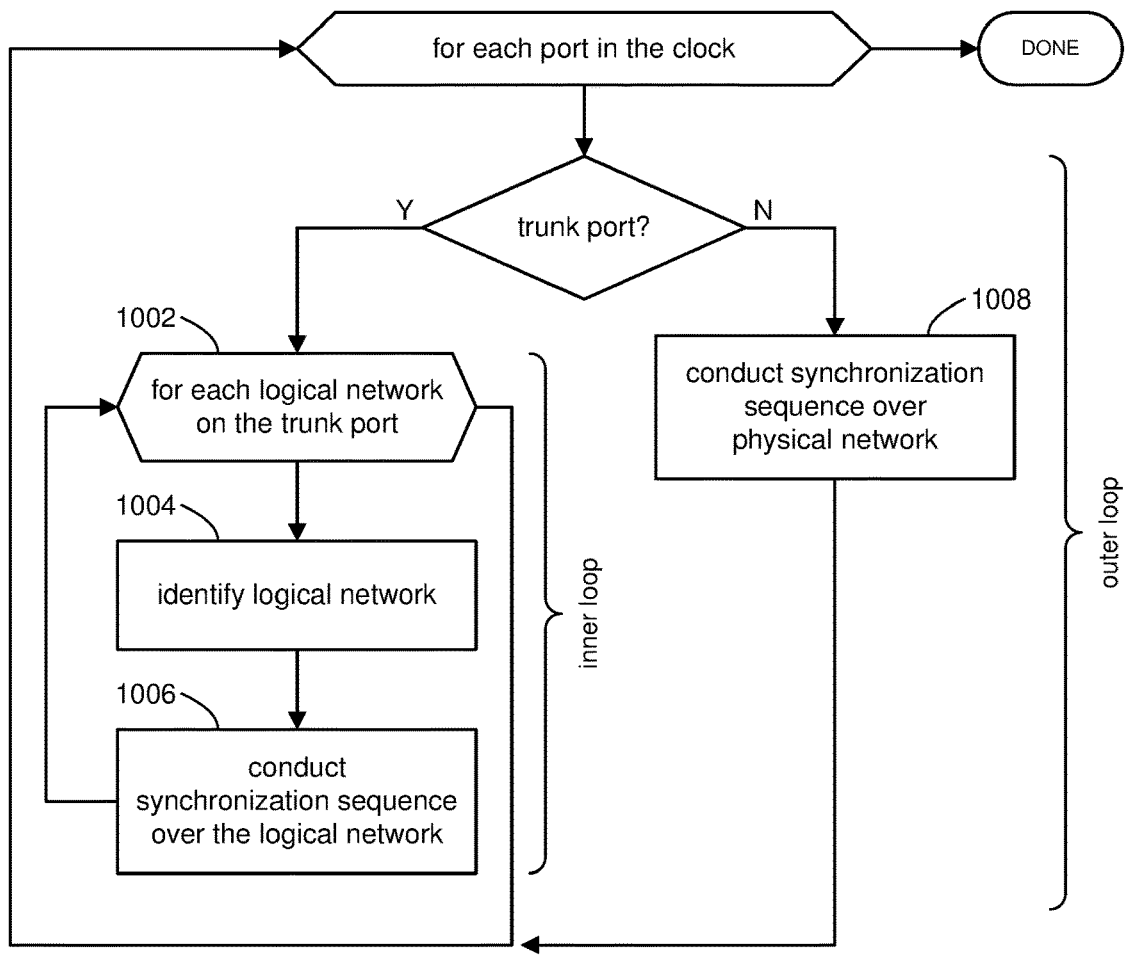
FIGS. 10A, 10B illustrate operations for synchronization between a clock in one device and a clock in a participating device in accordance with the present disclosure.

FIG. 10A shows a high level description of processing in a network device (clock) to synchronize with clocks connected to the network device in accordance with the present disclosure. In some embodiments, the clock can include computer executable program code, which when executed by a processor (e.g., 1202, FIG. 12) in the clock, can cause the processor to perform processing in accordance with FIG. 10A. The flow of operations performed by the processor is not necessarily limited to the order of operations shown. Moreover, operations may be combined or broken out into smaller operations in various embodiments.

Processing is generally performed for each port in the clock (outer loop). A port can be a trunk port or a non-trunk port. In accordance with the present disclosure, in the case of a trunk port, processing proceeds according to inner loop 1002. In the case of a non-trunk/access port, processing proceeds according to operation 1008.

At inner loop 1002, in the case of a trunk port, the clock can conduct a synchronization sequence with a participating clock over each logical network.

At operation 1004, the clock can identify the logical network on the trunk port. In some embodiments, for example, each logical network associated with a trunk port can be identified by a VLAN identifier (VID). As discussed below, the VID can be used for sending synchronization messages.

At operation 1006, the clock can conduct a synchronization sequence with a participating clock over the identified logical network. In accordance with the present disclosure, the trunk port can be a master port (MASTER state) relative to one participating clock on one logical network, in which case the clock can initiate a synchronization sequence by sending a Sync message and otherwise participate as a master port as depicted in FIG. 9. In accordance with the present disclosure the trunk port, at the same time, can also be a slave port (SLAVE state) relative to another participating clock on another logical network, in which case the clock can participate as a slave port as depicted in FIG. 9. FIG. 2C, for instance, illustrates an example, where port eth2 of boundary clock BC is a master port relative to port ethC on device D3 over VLAN30, and at the same time eth2 is a slave port relative to port ethB on device D2 over VLAN20.

At operation 1008, in the case of a non-trunk/access port, the clock can conduct a synchronization sequence with a participating clock on a communication path serviced by the non-trunk port. By comparison to a trunk port, which can be both a master port and a slave port, a non-trunk port is either in the MASTER state relative to the participating clock or in the SLAVE state.

Figure 10B:
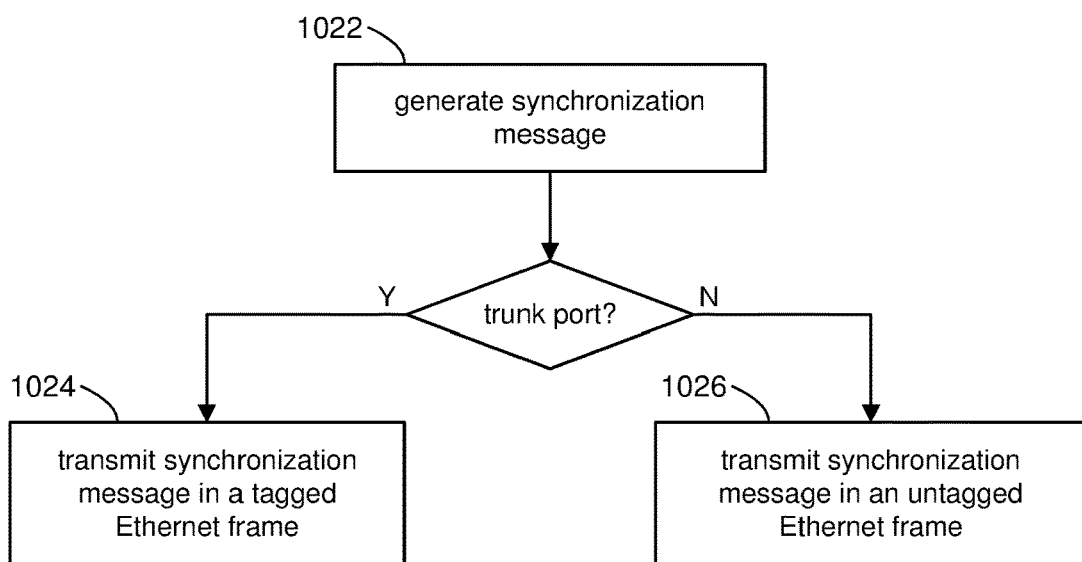

FIG. 10B shows a high level description of processing in a clock to synchronize with a participating clock in accordance with the present disclosure. In particular, the processing is performed with respect to a port (referred to herein for discussion purposes as the given port) on the clock. It is noted that the operations depicted in FIG. 10B are performed by the clock on each of the clock's ports and are applicable whether the port is a master port or a slave port. In some embodiments, the clock can include computer executable program code, which when executed by a processor (e.g., 1202, FIG. 12) in the clock, can cause the processor to perform processing in accordance with FIG. 10B. The flow of operations performed by the processor is not necessarily limited to the order of operations shown. Moreover, operations may be combined or broken out into smaller operations in various embodiments.

For discussion purposes, the operations will be explained in the context of synchronization in accordance with IEEE 1588-2008. It will be understood that the operations can be adapted to other synchronization techniques. Also, for discussion purposes, VLANs will be used as examples of logical networks and the configuration shown in FIGS. 2B, 2C will serve as an illustrative example.

At operation 1022, the clock can generate a synchronization message to be transmitted on the given port. In the case of a master port, the synchronization message can be a Sync message that initiates a synchronization sequence (e.g., FIG. 9) with another clock, a Follow_Up message, and a Delay_Resp message that completes the synchronization sequence. In the case of a slave port, the synchronization message can be a Delay_Req message. If the given port is a trunk port, processing can continue at operation 1024. If the given port is a non-trunk port/access, processing can continue at operation 1026.

Figure 11A:
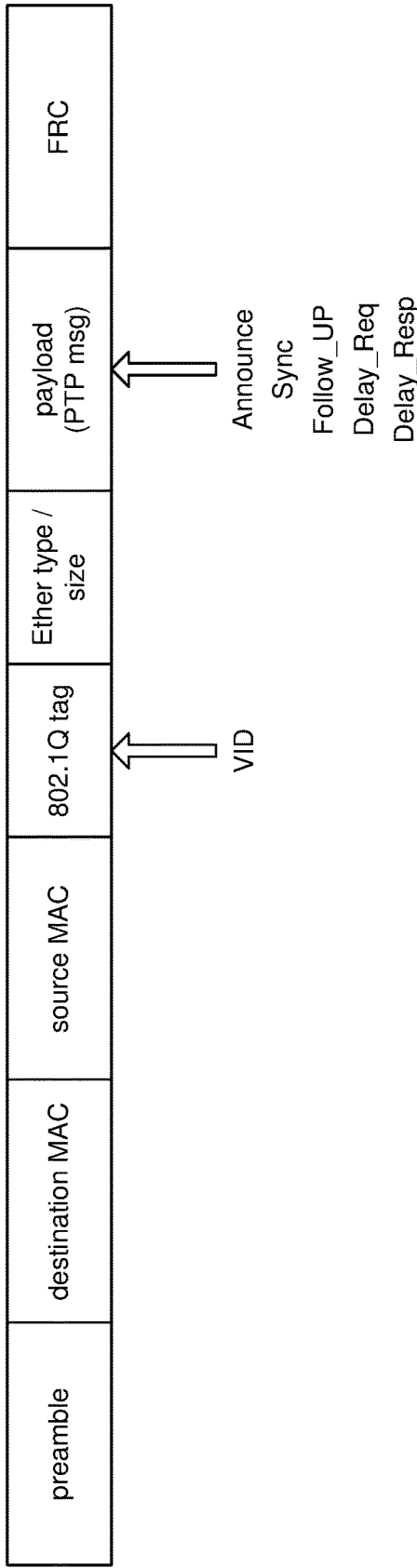
FIGS. 11A, 11B illustrate examples of Ethernet frames in accordance with the present disclosure.

At operation 1024, when the given port is a trunk port, the clock can transmit the synchronization message in a tagged Ethernet frame. Since the given port is a trunk port, the synchronization sequence will be performed over a VLAN associated with the trunk port. For example:

Sync message—When a master clock (e.g., D2, FIG. 2C) initiates a synchronization sequence with a slave clock (e.g., BC, FIG. 2C) on one of the VLANs associated with the trunk port, the master clock can identify the VLAN (e.g., VLAN20, FIG. 2C) by its VLAN identifier (VID). The VID can be used to tag the Ethernet frame that encapsulates the Sync message in accordance with the IEEE 802.1Q standard for VLAN tagging of Ethernet frames. FIG. 11A illustrates details of a tagged Ethernet frame.

Follow_Up message—Likewise, when the master clock sends a Follow_Up message to a slave clock, the encapsulating Ethernet frame can be tagged with the VID of the VLAN that the slave clock is on.

Delay_Req_message—When the slave clock sends a Delay_Req message to the master clock, the slave clock can identify the VLAN that the master clock is on by its VID. The Ethernet frame that encapsulates the Delay_Req message can be tagged with that VID.

Delay_Resp_message—When the master clock sends a Delay_Resp message to a slave clock, the encapsulating Ethernet frame can be tagged with the VID of the VLAN that the slave clock is on. In some embodiments, the messages can be transmitted in an un-tagged 802.1Q Ethernet frame on the native VLAN. When an un-tagged message is received, the message will refer to a specific VLAN, namely the native VLAN, which can be configured on a per port basis.

The synchronization message constitutes the payload of the tagged Ethernet frame. The source MAC address of the Ethernet frame can be the MAC address of the given port. It is noted that unicast transmission and multicast transmission modes are possible. In the case of unicast mode, the destination MAC address of the Ethernet frame can be the MAC address of the port of the remote clock that is participating in the synchronization sequence. In the case of multicast transmissions, for instance in accordance with IEEE 1588-2008, the destination MAC can be the multicast MAC of the PTP protocol, namely 01-1B-19-00-00-00. The tagged Ethernet frame can then be transmitted from the given port on the identified VLAN.

Figure 11B:
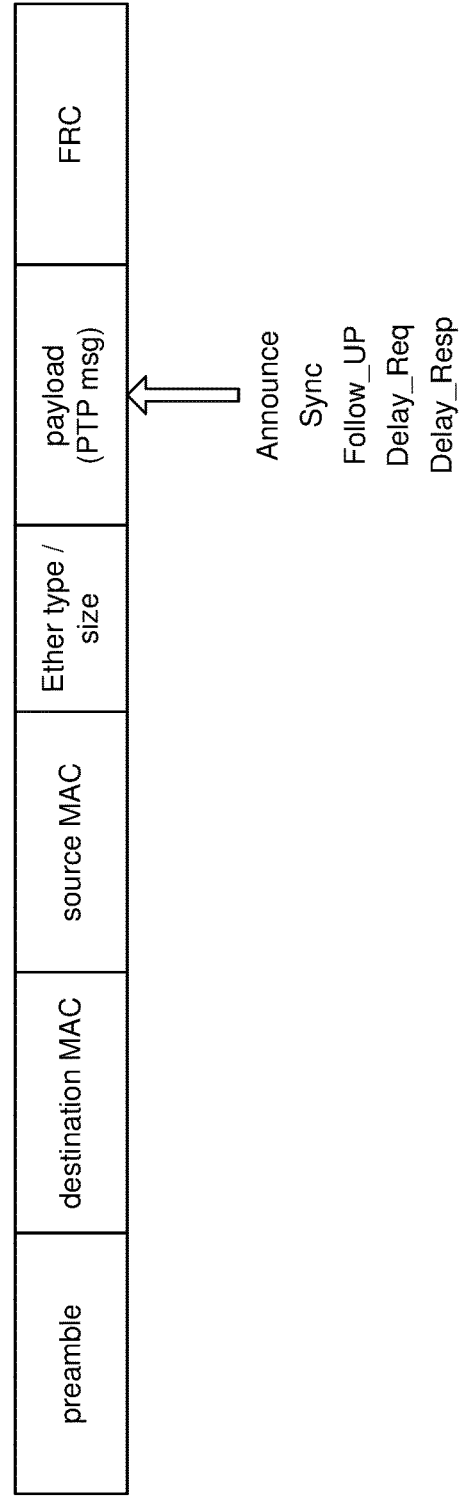

At operation 1026, when the given port is a non-trunk/access port, the clock can transmit the synchronization message in an untagged Ethernet frame. The payload of the Ethernet frame can be the synchronization message (Sync, Follow_Up, Delay_Req, Delay_Resp). FIG. 11B illustrates details of an untagged Ethernet frame. The untagged Ethernet frame can be transmitted from the given port.

Figure 12:
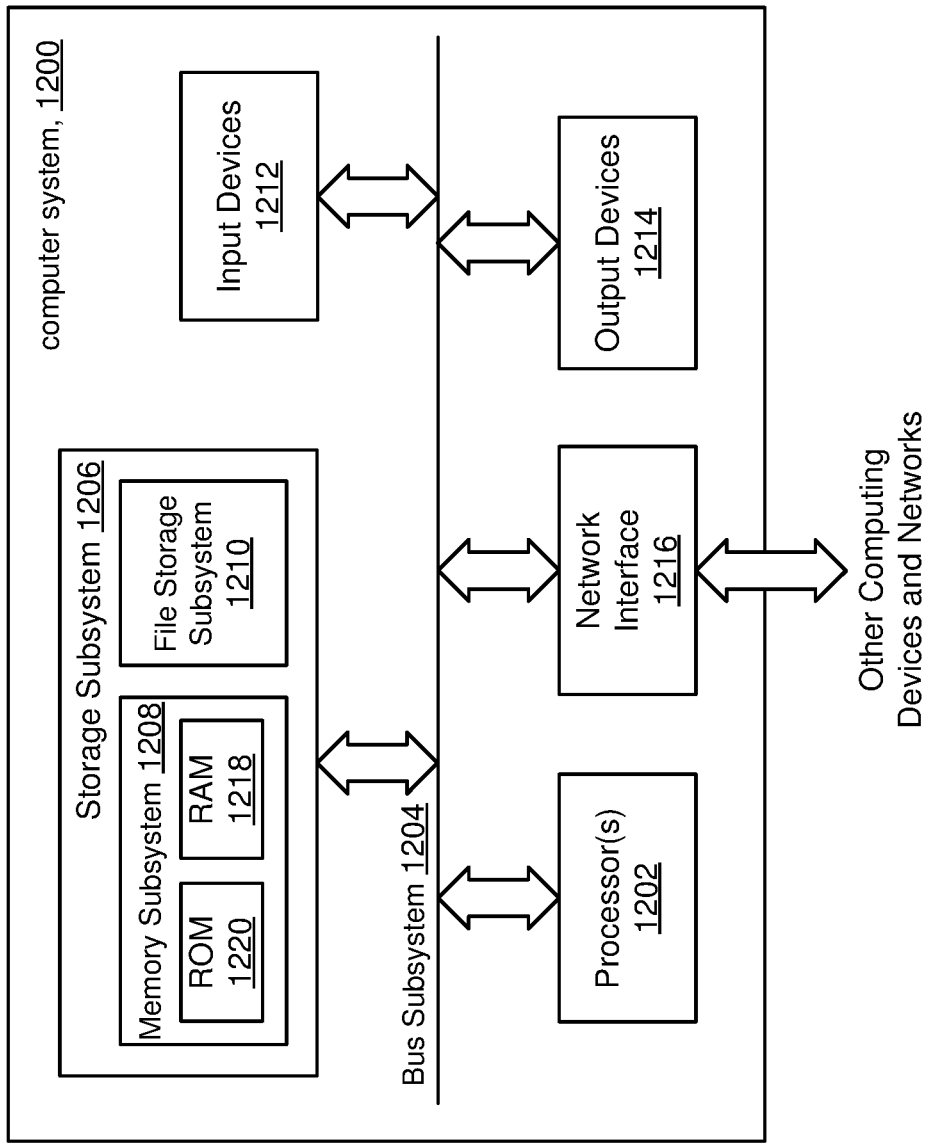
FIG. 12 shows an example of computing device in accordance with embodiments of the present disclosure.

FIG. 12 depicts a simplified block diagram of an example computer system 1200 according to certain embodiments. Computer system 1200 can be used to implement a computing device (e.g., D1, FIG. 1) or a network device (e.g., N1). As shown in FIG. 12, computer system 1200 includes one or more processors 1202 that communicate with a number of peripheral devices via bus subsystem 1204. These peripheral devices include storage subsystem 1206 (comprising memory subsystem 1208 and file storage subsystem 1210), user interface input devices 1212, user interface output devices 1214, and network interface subsystem 1216.

Bus subsystem 1204 can provide a mechanism for letting the various components and subsystems of computer system 1200 communicate with each other as intended. Although bus subsystem 1204 is shown schematically as a single bus, alternative embodiments of the bus subsystem can utilize multiple busses.

Network interface subsystem 1216 can serve as an interface for communicating data between computer system 1200 and other computer systems. Embodiments of network interface subsystem 1216 can include, e.g., an Ethernet card, a Wi-Fi adapter, and the like. Network interface subsystem 1216 can include non-transitory computer-readable storage media that can store program code and/or data, which when executed by logic in the interface, can cause the logic to perform operations in accordance with embodiments of the present disclosure.

User interface input devices 1212 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 1200.

User interface output devices 1214 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 1200.

Memory subsystem 1206 includes memory subsystem 1208 and file/disk storage subsystem 1210 represent non-transitory computer-readable storage media that can store program code and/or data, which when executed by processor 1202, can cause processor 1202 to perform operations in accordance with embodiments of the present disclosure.

Memory subsystem 1208 includes a number of memories including main random access memory (RAM) 1218 for storage of instructions and data during program execution and read-only memory (ROM) 1220 in which fixed instructions are stored. File storage subsystem 1210 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1200 is illustrative and many other configurations having more or fewer components than system 1200 are possible.

Virtual Ports

The foregoing embodiments describe physical ports on physical devices (computers, switches, etc.). It will be appreciated, however, that the present disclosure can be performed in a virtual environment. For example, a virtual environment can be configured with virtual machines configured as a computing devices and/or network devices with corresponding virtual ports. In some embodiments, a network may comprise a combination of physical devices and virtual devices (virtual machines). Embodiments in accordance with the present disclosure can be adapted to virtual ports on virtual devices. Configurations that include a virtual environment can be useful for simulation purposes, for example to assess whether the process will converge properly in a network of switches.

FURTHER EXAMPLES

A method in accordance with the present disclosure can include determining a first clock data associated with a first logical network that is configured on a first port of a network device, including receiving on the first port a first plurality of clock data associated with one or more first devices, the first clock data determined based on the first plurality of clock data. The method can further include determining a second clock data associated with a second logical network that is different from the first logical network and is also configured on the first port of the network device, including receiving on the first port a second plurality of clock data associated with one or more second devices, the second clock data determined based on the second plurality of clock data. The method can further include setting a first state variable that is associated with the first logical network on the first port based at least on a device clock data of the network device and the first clock data. The method can further include setting a second state variable that is associated with the second logical network on the first port based at least on the device clock data and the second clock data.

In some embodiments of the method, receiving the first plurality of clock data on the first port can include receiving first data frames that encapsulate the first plurality of clock data, the first data frames tagged with information that designates the first logical network, wherein receiving the second plurality of clock data on the first port can include receiving second data frames that encapsulate the second plurality of clock data, the second data frames tagged with information that designates the second logical network.

In some embodiments of the method, the one or more first devices communicate on the first logical network, wherein the one or more second devices communicate on the second logical network.

In some embodiments, the method can further include selecting the first clock data or the second clock data as selected clock data, wherein the first and second state variables are further based at least on the selected clock data.

In some embodiments of the method, the first clock data corresponds to a device on the first logical network that is deemed to provide the most accurate time among the plurality of first devices, wherein the second clock data corresponds to a device on the second logical network that is deemed to provide the most accurate time among the plurality of second devices.

In some embodiments, the method can further include determining a third clock data associated with a second port of the network device, including receiving a third plurality of clock data from one or more third devices connected to the second port of the network device, the third clock data determined based on the third plurality of clock data, wherein the second port is not associated with any logical networks, wherein setting the first and second state variables associated with the first port are further based at least on the third clock data. The method can further include selecting the first, second, or third clock data as selected clock data, wherein the first and second state variables associated with the first port is further based at least on the selected clock data, wherein the selected clock data corresponds to a device deemed to have the most accurate clock among devices that correspond respectively to the first, second, and third clock data.

In some embodiments of the method, the first logical network is a first VLAN that is enabled on the first port and the second logical network is a second VLAN that is enabled on the first port.

In some embodiments of the method, the first port is a virtual port on a virtual machine.

A non-transitory computer-readable storage medium in accordance with the present disclosure can have stored thereon computer executable instructions, which when executed by a processor in a network, can cause the processor to: determine first clock data associated with a first logical network that is configured on a first port of the network device, including receiving on the first port a first plurality of clock data associated with one or more first devices, the first clock data determined based on the first plurality of clock data; determine second clock data associated with a second logical network that is different from the first logical network and is also configured on the first port of the network device, including receiving on the first port a second plurality of clock data associated with one or more second devices, the second clock data determined based on the second plurality of clock data; set a first state variable that is associated with the first logical network on the first port based at least on a device clock data of the network device and the first clock data; and set a second state variable that is associated with the second logical network on the first port based at least on the device clock data and the second clock data.

In some embodiments, receiving the first plurality of clock data on the first port can include receiving first data frames that encapsulate the first plurality of clock data, the first data frames tagged with information that designates the first logical network, wherein receiving the second plurality of clock data on the first port can include receiving second data frames that encapsulate the second plurality of clock data, the second data frames tagged with information that designates the second logical network.

In some embodiments, the computer executable instructions, which when executed by the processor, can further cause the processor to select the first clock data or the second clock data as selected clock data, wherein the first and second state variables are further based at least on the selected clock data.

In some embodiments, the first clock data corresponds to a device on the first logical network that is deemed to provide the most accurate time among the plurality of first devices, wherein the second clock data corresponds to a device on the second logical network that is deemed to provide the most accurate time among the plurality of second devices.

In some embodiments, the computer executable instructions, which when executed by the processor, can further cause the processor to determine a third clock data associated with a second port of the network device, including receiving a third plurality of clock data from one or more third devices connected to the second port of the network device, the third clock data determined based on the third plurality of clock data, wherein the second port is not associated with any logical networks, wherein setting the first and second state variables associated with the first port are further based at least on the third clock data.

In some embodiments, the computer executable instructions, which when executed by the processor, can further cause the processor to select the first, second, or third clock data as selected clock data, wherein the first and second state variables are further based at least on the selected clock data.

A network device in accordance with the present disclosure can include a first port; one or more computer processors; and a computer-readable storage medium comprising instructions for controlling the one or more computer processors to be operable to: determine a first clock data associated with a first logical network that is configured on the first port of the network device, including receiving on the first port a first plurality of clock data associated with one or more first devices, the first clock data determined based on the first plurality of clock data;

determine a second clock data associated with a second logical network that is different from the first logical network and is also configured on the first port of the network device, including receiving on the first port a second plurality of clock data associated with one or more second devices, the second clock data determined based on the second plurality of clock data; set a first state variable that is associated with the first logical network on the first port based at least on a device clock data of the network device and the first clock data; and set a second state variable that is associated with the second logical network on the first port based at least on the device clock data and the second clock data.

In some embodiments of the network device, receiving the first plurality of clock data on the first port can include receiving first data frames that encapsulate the first plurality of clock data, the first data frames tagged with information that designates the first logical network, wherein receiving the second plurality of clock data on the first port can include receiving second data frames that encapsulate the second plurality of clock data, the second data frames tagged with information that designates the second logical network.

In some embodiments of the network device, the computer-readable storage medium can further comprise instructions for controlling the one or more computer processors to select the first clock data or the second clock data as selected clock data, wherein the first and second state variables are further based at least on the selected clock data In some embodiments of the network device, the first clock data corresponds to a device on the first logical network that is deemed to provide the most accurate time among the plurality of first devices, wherein the second clock data corresponds to a device on the second logical network that is deemed to provide the most accurate time among the plurality of second devices.

In some embodiments of the network device, the computer-readable storage medium can further comprise instructions for controlling the one or more computer processors to determine a third clock data associated with a second port of the network device, including receiving a third plurality of clock data from one or more third devices connected to the second port of the network device, the third clock data determined based on the third plurality of clock data, wherein the second port is not associated with any logical networks, wherein setting the first and second state variables associated with the first port are further based at least on the third clock data.

In some embodiments of the network device, the computer-readable storage medium can further comprise instructions for controlling the one or more computer processors to select the first, second, or third clock data as selected clock data, wherein the first and second state variables are further based at least on the selected clock data.

A method in accordance with the present disclosure can include synchronizing a clock in a network device with a clock in a first participating device on a first logical network, including exchanging first synchronization messages between a port of the network device and a port on the first participating device, wherein exchanging first synchronization messages can include providing an identifier with the first synchronization messages that identifies the first logical network. The method can further include synchronizing the clock in the network device with a clock in a second participating device on a second logical network different from the first logical network, including exchanging second synchronization messages between the port of the network device and a port on the second participating device, wherein exchanging second synchronization messages can include providing an identifier with the second synchronization messages that identifies the second logical network.

In some embodiments of the method, the port on the network device can be a master port with respect to the port on the first participating device and a slave port with respect to the port on the second participating device.

In some embodiments, the method can further include the port on the network device: initiating a first synchronization sequence with the port on the first participating device; and performing a second synchronization sequence with the port on the second participating device in response to the second participating device initiating the second synchronization sequence.

In some embodiments of the method, exchanging first synchronization messages with the first participating device can include encapsulating the first synchronization messages in corresponding data frames and tagging the data frames with the identifier that identifies the first logical network, wherein exchanging second synchronization messages with the second participating device can include encapsulating the second synchronization messages in corresponding data frames and tagging the data frames with the identifier that identifies the second logical network.

In some embodiments of the method, the first logical network can be a first VLAN that is enabled on the port and the second logical network can be a second VLAN that is enabled on the port.

A non-transitory computer-readable storage medium in accordance with the present disclosure can have stored thereon computer executable instructions, which when executed by a processor in a network device, can cause the processor to: synchronize a clock in the network device with a clock in a first participating device on a first logical network, including exchanging first synchronization messages between the port of the network device and a port on the first participating device, wherein exchanging first synchronization messages can include providing an identifier with the first synchronization messages that identifies the first logical network; and synchronize the clock in the network device with a clock in a second participating device on a second logical network different from the first logical network, including exchanging second synchronization messages between the port of the network device and a port on the second participating device, wherein exchanging second synchronization messages can include providing an identifier with the second synchronization messages that identifies the second logical network.

In some embodiments, the port on the network device can be a master port with respect to the port on the first participating device and a slave port with respect to the port on the second participating device.

In some embodiments, the computer executable instructions, which when executed by the processor, can further cause the processor to: initiate a first synchronization sequence with the port on the first participating device; and perform a second synchronization sequence with the port on the second participating device in response to the second participating device initiating the second synchronization sequence.

In some embodiments, exchanging first synchronization messages with the first participating device can include encapsulating the first synchronization messages in corresponding data frames and tagging the data frames with the identifier that identifies the first logical network, wherein exchanging second synchronization messages with the second participating device can include encapsulating the second synchronization messages in corresponding data frames and tagging the data frames with the identifier that identifies the second logical network.

In some embodiments, the first logical network is a first VLAN that is enabled on the port and the second logical network is a second VLAN that is enabled on the port.

A network device in accordance with the present disclosure can include a port; a clock; one or more computer processors; and a computer-readable storage medium comprising instructions for controlling the one or more computer processors to be operable to: synchronize the clock in the network device with a clock in a first participating device on a first logical network, including exchanging first synchronization messages between the port of the network device and a port on the first participating device, wherein exchanging first synchronization messages can include providing an identifier with the first synchronization messages that identifies the first logical network; and synchronize the clock in the network device with a clock in a second participating device on a second logical network different from the first logical network, including exchanging second synchronization messages between the port of the network device and a port on the second participating device, wherein exchanging second synchronization messages can include providing an identifier with the second synchronization messages that identifies the second logical network.

In some embodiments of the network device, the port on the network device can be a master port with respect to the port on the first participating device and a slave port with respect to the port on the second participating device.

In some embodiments of the network device, the computer-readable storage medium can further comprise instructions for controlling the one or more computer processors to: initiate a first synchronization sequence with the port on the first participating device; and perform a second synchronization sequence with the port on the second participating device in response to the second participating device initiating the second synchronization sequence.

In some embodiments of the network device, exchanging first synchronization messages with the first participating device can include encapsulating the first synchronization messages in corresponding data frames and tagging the data frames with the identifier that identifies the first logical network, wherein exchanging second synchronization messages with the second participating device can include encapsulating the second synchronization messages in corresponding data frames and tagging the data frames with the identifier that identifies the second logical network.

In some embodiments of the network device, the first logical network is a first VLAN that is enabled on the port and the second logical network is a second VLAN that is enabled on the port.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method comprising:
   determining first clock data associated with a first logical network that is configured on a first port of a network device, including receiving on the first port a first plurality of clock data associated with one or more first devices, the first clock data determined based on the first plurality of clock data;
   determining second clock data associated with a second logical network that is different from the first logical network and is also configured on the first port of the network device, including receiving on the first port a second plurality of clock data associated with one or more second devices, the second clock data determined based on the second plurality of clock data;
   setting a first state variable that is associated with the first logical network on the first port based at least on device clock data associated with the network device and the first clock data; and
   setting a second state variable that is associated with the second logical network on the first port based at least on the device clock data and the second clock data.

2. The method of claim 1, wherein receiving the first plurality of clock data on the first port includes receiving first data frames that encapsulate the first plurality of clock data, the first data frames tagged with information that designates the first logical network, wherein receiving the second plurality of clock data on the first port includes receiving second data frames that encapsulate the second plurality of clock data, the second data frames tagged with information that designates the second logical network.

3. The method of claim 1, wherein the one or more first devices communicate on the first logical network, wherein the one or more second devices communicate on the second logical network.

4. The method of claim 1, further comprising selecting the first clock data or the second clock data as selected clock data, wherein the first and second state variables are further based at least on the selected clock data.

5. The method of claim 1, wherein the first clock data corresponds to a device on the first logical network that is deemed to provide the most accurate time among the plurality of first devices, wherein the second clock data corresponds to a device on the second logical network that is deemed to provide the most accurate time among the plurality of second devices.

6. The method of claim 1, further comprising determining third clock data associated with a second port of the network device, including receiving a third plurality of clock data from one or more third devices connected to the second port of the network device, the third clock data determined based on the third plurality of clock data, wherein the second port is not associated with any logical networks, wherein setting the first and second state variables associated with the first port is further based at least on the third clock data.

7. The method of claim 6, further comprising selecting the first, second, or third clock data as selected clock data, wherein the first and second state variables associated with the first port is further based at least on the selected clock data, wherein the selected clock data corresponds to a device deemed to have the most accurate clock among devices that correspond respectively to the first, second, and third clock data.

8. The method of claim 1, wherein the first logical network is a first VLAN that is enabled on the first port and the second logical network is a second VLAN that is enabled on the first port.

9. The method of claim 1, wherein the first port is a virtual port on a virtual machine.

10. A non-transitory computer-readable storage medium having stored thereon computer executable instructions, which when executed by a processor in a network, cause the processor to:
    determine first clock data associated with a first logical network that is configured on a first port of the network device, including receiving on the first port a first plurality of clock data associated with one or more first devices, the first clock data determined based on the first plurality of clock data;
    determine second clock data associated with a second logical network that is different from the first logical network and is also configured on the first port of the network device, including receiving on the first port a second plurality of clock data associated with one or more second devices, the second clock data determined based on the second plurality of clock data;
    set a first state variable that is associated with the first logical network on the first port based at least on device clock data of the network device and the first clock data; and
    set a second state variable that is associated with the second logical network on the first port based at least on the device clock data and the second clock data.

11. The non-transitory computer-readable storage medium of claim 10, wherein receiving the first plurality of clock data on the first port includes receiving first data frames that encapsulate the first plurality of clock data, the first data frames tagged with information that designates the first logical network, wherein receiving the second plurality of clock data on the first port includes receiving second data frames that encapsulate the second plurality of clock data, the second data frames tagged with information that designates the second logical network.

12. The non-transitory computer-readable storage medium of claim 10, wherein the computer executable instructions, which when executed by the processor, further cause the processor to select the first clock data or the second clock data as selected clock data, wherein the first and second state variables are further based at least on the selected clock data.

13. The non-transitory computer-readable storage medium of claim 10, wherein the first clock data corresponds to a device on the first logical network that is deemed to provide the most accurate time among the plurality of first devices, wherein the second clock data corresponds to a device on the second logical network that is deemed to provide the most accurate time among the plurality of second devices.

14. The non-transitory computer-readable storage medium of claim 10, wherein the computer executable instructions, which when executed by the processor, further cause the processor to determine third clock data associated with a second port of the network device, including receiving a third plurality of clock data from one or more third devices connected to the second port of the network device, the third clock data determined based on the third plurality of clock data, wherein the second port is not associated with any logical networks, wherein setting the first and second state variables associated with the first port are further based at least on the third clock data.

15. The non-transitory computer-readable storage medium of claim 14, wherein the computer executable instructions, which when executed by the processor, further cause the processor to select the first, second, or third clock data as selected clock data, wherein the first and second state variables are further based at least on the selected clock data.

16. A network device comprising:
   a first port;
   one or more computer processors; and
   a computer-readable storage medium comprising instructions for controlling the one or more computer processors to be operable to:
   determine first clock data associated with a first logical network that is configured on the first port of the network device, including receiving on the first port a first plurality of clock data associated with one or more first devices, the first clock data determined based on the first plurality of clock data;
   determine second clock data associated with a second logical network that is different from the first logical network and is also configured on the first port of the network device, including receiving on the first port a second plurality of clock data associated with one or more second devices, the second clock data determined based on the second plurality of clock data;
   set a first state variable that is associated with the first logical network on the first port based at least on device clock data of the network device and the first clock data; and
   set a second state variable that is associated with the second logical network on the first port based at least on the device clock data and the second clock data.

17. The network device of claim 16, wherein receiving the first plurality of clock data on the first port includes receiving first data frames that encapsulate the first plurality of clock data, the first data frames tagged with information that designates the first logical network, wherein receiving the second plurality of clock data on the first port includes receiving second data frames that encapsulate the second plurality of clock data, the second data frames tagged with information that designates the second logical network.

18. The network device of claim 16, wherein the computer-readable storage medium further comprises instructions for controlling the one or more computer processors to select the first clock data or the second clock data as selected clock data, wherein the first and second state variables are further based at least on the selected clock data.

19. The network device of claim 16, wherein the first clock data corresponds to a device on the first logical network that is deemed to provide the most accurate time among the plurality of first devices, wherein the second clock data corresponds to a device on the second logical network that is deemed to provide the most accurate time among the plurality of second devices.

20. The network device of claim 16, wherein the computer-readable storage medium further comprises instructions for controlling the one or more computer processors to determine a third clock data associated with a second port of the network device, including receiving a third plurality of clock data from one or more third devices connected to the second port of the network device, the third clock data determined based on the third plurality of clock data, wherein the second port is not associated with any logical networks, wherein setting the first and second state variables associated with the first port are further based at least on the third clock data.

21. The network device of claim 20, wherein the computer-readable storage medium further comprises instructions for controlling the one or more computer processors to select the first, second, or third clock data as selected clock data, wherein the first and second state variables are further based at least on the selected clock data.

* * * * *